(12) United States Patent
Vasilev

(10) Patent No.: US 11,015,682 B2
(45) Date of Patent: May 25, 2021

(54) FIXED-RATIO PLANETARY TRACTION GEAR

(71) Applicant: SEMPLIKA LTD, Sofia (BG)

(72) Inventor: Yavor Georgiev Vasilev, Sofia (BG)

(73) Assignee: SEMPLIKA LTD, Sofia (BG)

( * ) Notice: Subject to any disclaimer, the term of this patent is extended or adjusted under 35 U.S.C. 154(b) by 0 days.

(21) Appl. No.: 16/965,998

(22) PCT Filed: Jul. 1, 2019

(86) PCT No.: PCT/BG2019/000016
§ 371 (c)(1),
(2) Date: Jul. 29, 2020

(87) PCT Pub. No.: WO2020/010413
PCT Pub. Date: Jan. 16, 2020

(65) Prior Publication Data
US 2020/0355244 A1    Nov. 12, 2020

(30) Foreign Application Priority Data

Jul. 11, 2018  (BG) .......................................... 112770

(51) Int. Cl.
*F16H 1/28* (2006.01)
*F16H 57/08* (2006.01)

(52) U.S. Cl.
CPC ......... *F16H 1/2836* (2013.01); *F16H 57/082* (2013.01); *F16H 2057/085* (2013.01)

(58) Field of Classification Search
CPC ................. F16H 1/2836; F16H 57/082; F16H 2057/085; F16H 1/2827; F16H 57/021
See application file for complete search history.

(56) References Cited

U.S. PATENT DOCUMENTS

| | | | |
|---|---|---|---|
| 2003/0008748 A1* | 1/2003 | Fox | F16H 1/2836 475/346 |
| 2004/0247437 A1* | 12/2004 | Otaki | F16H 13/14 416/132 B |
| 2017/0204947 A1* | 7/2017 | Klassen | F16H 57/025 |

FOREIGN PATENT DOCUMENTS

| | | |
|---|---|---|
| EP | 0719964 | 7/1996 |
| EP | 2647881 | 10/2013 |
| WO | WO 2011/130352 | 10/2011 |

OTHER PUBLICATIONS

PCT/BG2019/000016, International Search Report, dated Jan. 16, 2020.
(Continued)

*Primary Examiner* — Justin Holmes
(74) *Attorney, Agent, or Firm* — Neifeld IP Law, PLLC

(57) ABSTRACT

The gear is used for driving pneumatic turbomachinery while providing insignificant impact of the tolerances on the performance parameters leading to extended service life. It comprises a sun shaft (1) supported and driven by at least three planet wheels (2) rotating around their axes, on each side of which in axial direction there is an identical radially-elastic flat frame (7) in the shape of a flat planar closed-contour element having at least three annular bearing slots (7.1) with a cylindrical hole accepting the respective bearings (4) of the planet wheels (2). The bearing slots (7.1) are equidistant from the center of the frame (7) and each two adjacent bearing slots (7.1) are connected to one another via a respective curvilinear bridge (7.2) whose inner bend, towards the center, has an ear formed thereon (7.4) accepting the respective support pillar (6) fixed to the rear housing (5).

15 Claims, 16 Drawing Sheets

(56) References Cited

OTHER PUBLICATIONS

PCT/BG2019/000016, International Written Opinion, dated Jan. 16, 2020.

* cited by examiner

FIXED-RATIO PLANETARY TRACTION GEAR

FIELD OF APPLICATION

The invention relates to a fixed-ratio planetary traction gear to be used for driving pneumatic turbomachinery and in particular side-channel, radial, and single-stage axial; gears with very high rotational speeds of the input or output shaft, i.e. over 15000 rad/sec; single-stage gears with high gear ratio, i.e. up to 13.5; gears with low operational noise requirements; gears with requirements for relative slip between the input and output shaft; gears operating under heavy external vibrations.

PRIOR ART

It is known of a fixed-ratio planetary traction gear [1] comprising a rotating sun shaft with an axis of rotation that coincides with the axis of the input shaft whose bearings are located in a housing. The sun shaft is supported and driven by three hollow cylindrical planet wheels which rotate around their own axes enclosed inside a radially-elastic outer ring fixed axially by the input shaft. The center bore of two of the planet wheels encase fixed coaxial cylindrical stays. The third planet wheel is movable as it is mounted with a radial clearance between its center bore and the respective stay. The bearing slots of the planet wheels are formed during the moving rotational contact between their center bores and the respective stay. The outer ring is installed by pre-stretching it radially over the planet wheels, which position it radially and are driven by it. The sun shaft is fixed in the axial direction by its contact with the planet wheels.

The main disadvantage of the aforedescribed design has to do with the fact that in order to provide the maximum ramp effect, it is required exceptionally precise radial positioning of the stay, which is eccentrically mounted and with a clearance in the movable planet wheel.

Furthermore, at the particular radial position of the stay, corresponding to the maximum ramp effect to be achieved, the clearance between the stay and the central bore of the movable planet wheel is entirely consumed in one direction, therefore the accumulated deviations from the nominal dimensions within the manufacturing tolerances along the tolerance chain cannot be compensated for in the opposite direction, potentially leading to generation of an uncontrolled radial load on the bearings of all planet wheels or inability the gear to be assembled.

On the other hand, if the said stay is positioned with zero eccentricity as to the movable planet wheel, where the largest deviations from the nominal dimensions within the manufacturing tolerances are tolerated, the desired ramp effect cannot be achieved.

To overcome these design characteristics of the planetary gear which act simultaneously and in a mutually-opposing fashion, the rotating and housing elements must be manufactured to exceptionally tight tolerances, which are not required by the functional nature of traction gears and present a considerable technological challenge for today's engineering industry. Moreover, even with such tight tolerances, the ramp effect cannot be controlled precisely due to its random nature and heavy dependence on positioning of the movable planet with reference to the stay and the true dimensions of the elements. The considerable impact of the manufacturing tolerances on the performance of the gear causes deterioration and inconsistencies in its technical characteristics, thus reducing its operational life.

SUMMARY OF THE INVENTION

The aim of the invention is the creation of a fixed-ratio planetary traction gear for which the manufacturing tolerances in the nominal dimensions of major components have only negligible effect on its technical characteristics, allowing them to remain consistent thereby extending the operational life of the gear.

This aim is achieved via a fixed-ratio planetary traction gear comprising a rotating sun shaft whose axis of rotation coincides with the axis of an input shaft, which is mounted on bearings into a housing. The sun shaft is supported and driven by at least three rotating around their own axes planet wheels encompassed by an outer ring axially fixed to the input shaft and installed by means of radial pre-stretch over the planet wheels, which position the said outer ring in radial direction and are driven by it. The planet wheels are mounted onto respective bearing slots. The sun shaft is fixed axially by the contact with the planet wheels. According to the invention the housing comprises a rear housing with support pillars fixed to it and equal in number to the planet wheels. Each support pillar is located symmetrically between two adjacent planet wheels. Located on each side of the planet wheels in the axial direction, there is an identical, radially-elastic flat frame, which is movable in relation to the housing. The said frames have respective bearing slots to accept the bearings of the planet wheels and respective ears to accept the support pillars.

Each elastic flat frame is a flat, planar, closed-contour component with constant thickness, which comprises at least three annular bearing slots with a cylindrical hole to accept the respective bearing of the respective planet wheel. The axes of the annular bearing slots are parallel to the axis of the sun shaft and the annular bearing slots are equidistant from the center of the frame. Each two adjacent annular bearing slots are connected to one another via a respective curvilinear bridge whose inner bend, towards the center, has an ear formed thereon to accept the respective support pillar. The axes of the annular bearing slots coincide with the axes of the respective planet wheels.

In fully assembled state each elastic flat frame is pre-stressed in radial direction by selection of the concentricity factor CF.

Each ear of the elastic flat frames has the shape of a closed contour or a part thereof.

The ears may be equidistant to each other.

The cylindrical hole in each of the ears has at least one radial undercut.

The radial undercut is concave in relation to the cylindrical hole in the ears, has a curvilinear shape and is symmetrical to the line connecting the axis of the ear and the center of the frame, and is limited by a respective segment angle α, ß.

The cylindrical hole in each of the ears may have an outer radial undercut and an inner radial undercut.

The segment angle α is within the range of 10° to 90° while the segment angle ß is within the range of 10° to 70°.

The support pillars may have the shape of cylinders.

The support pillars may have the shape of prisms.

The ratio of the radial stiffness of the outer ring to the radial stiffness of the frame is within the range of 5 to 100.

The eccentricity of the annular ear in relation to the support pillar is within the range of 0.1% to 3.0% of the pitch circle radius $R_1+R_2$ of the planet wheels.

The concentricity factor is within the range of −3% to +3% of the pitch circle radius $R_1+R_2$ of the planet wheels.

The advantage of the fixed-ratio planetary traction gear, according to the invention, is that the manufacturing tolerances in the nominal dimensions of the major components have virtually no impact over the technical characteristics of the gear, keeping them practically constant thereby extending the gear operational life. This is due to increased capability to compensate for the deviations from the nominal dimensions within the manufacturing tolerances along the tolerance chain between the contact zones of the sun shaft with the planet wheels and the housing. This is achieved by the addition of the new elements, namely the two identical elastic frames with controlled radial stiffness, between the housing and the bearings of the planet wheels. The frames support and position all planet wheels simultaneously while also providing possibility for radial displacements due to the elastic deformations in their structure. By preselecting the static settings of the gear, it is possible to generate initial additional static force between the planet wheels and the sun shaft, loading or unloading the last, thus allowing for the optimal distribution of the radial forces ratio and the contact stresses between rotating elements in the various operational modes in order to improve the technical parameters and increase reliability and operational life.

Another advantage of the fixed-ratio planetary traction gear, according to the invention, is that it allows certain technological difficulties in the manufacturing process to be eliminated due to the relatively simple geometric shapes of the frame and the support pillars, which do not require the use of special technological processes to be manufactured.

An additional advantage of the fixed-ratio planetary traction gear, according to the invention, is the ability to operate under heavy external vibrations due to the relatively good vibration-absorbing properties of the frames thus reducing the combined dynamic load exerted on the bearings and the turbomachinery, such as compressor or turbine wheels, operating at high rotational speed.

DETAILED DESCRIPTION OF THE EMBODIMENTS OF THE INVENTION

The invention is explained in details with the help of several embodiments depicted in the attached figures where:

FIG. 3a is a transverse section view in the II-II plane of the gear shown on FIG. 2a;

FIG. 3b is a larger scale detailed view of the contact area between the frame ears and the support pillars;

Figure 7:
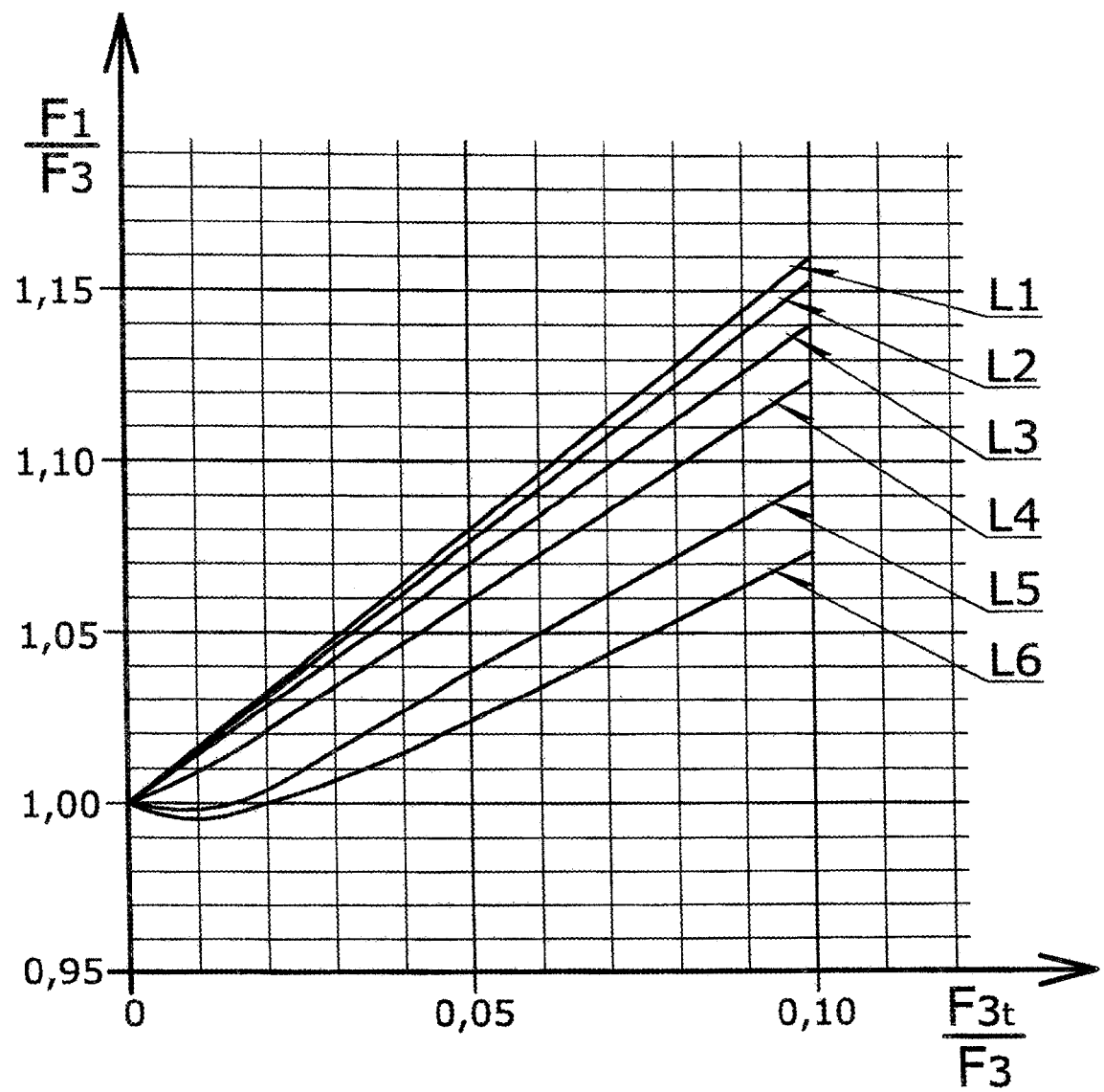
FIG. 7 is a nomogram showing the redistributed radial forces ratio for the forces acting between the sun shaft and the outer ring as a function of the transferred torque for three reference values of the radial stiffness factor RSF for the first and the second embodiments of the invention.
Figure 9:
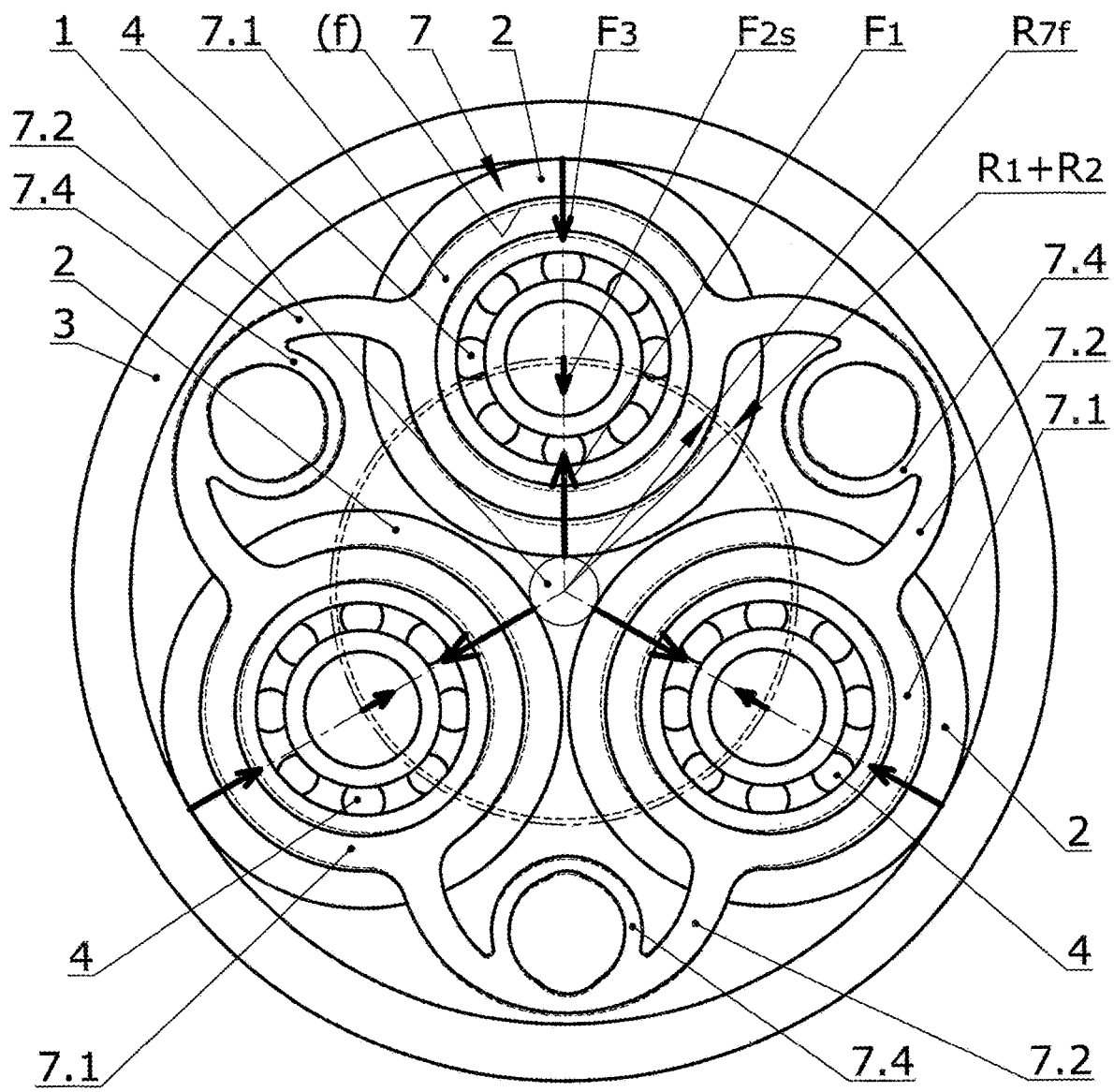
FIG. 9 is a frontal view of the major gear components detailing the emergence of additional radial forces towards the sun shaft from the prestressing of the frame in the radial direction by the forced displacement of the cylindrical holes of the bearing slots during assembly for the first and the second embodiments of the invention.
Figure 10:
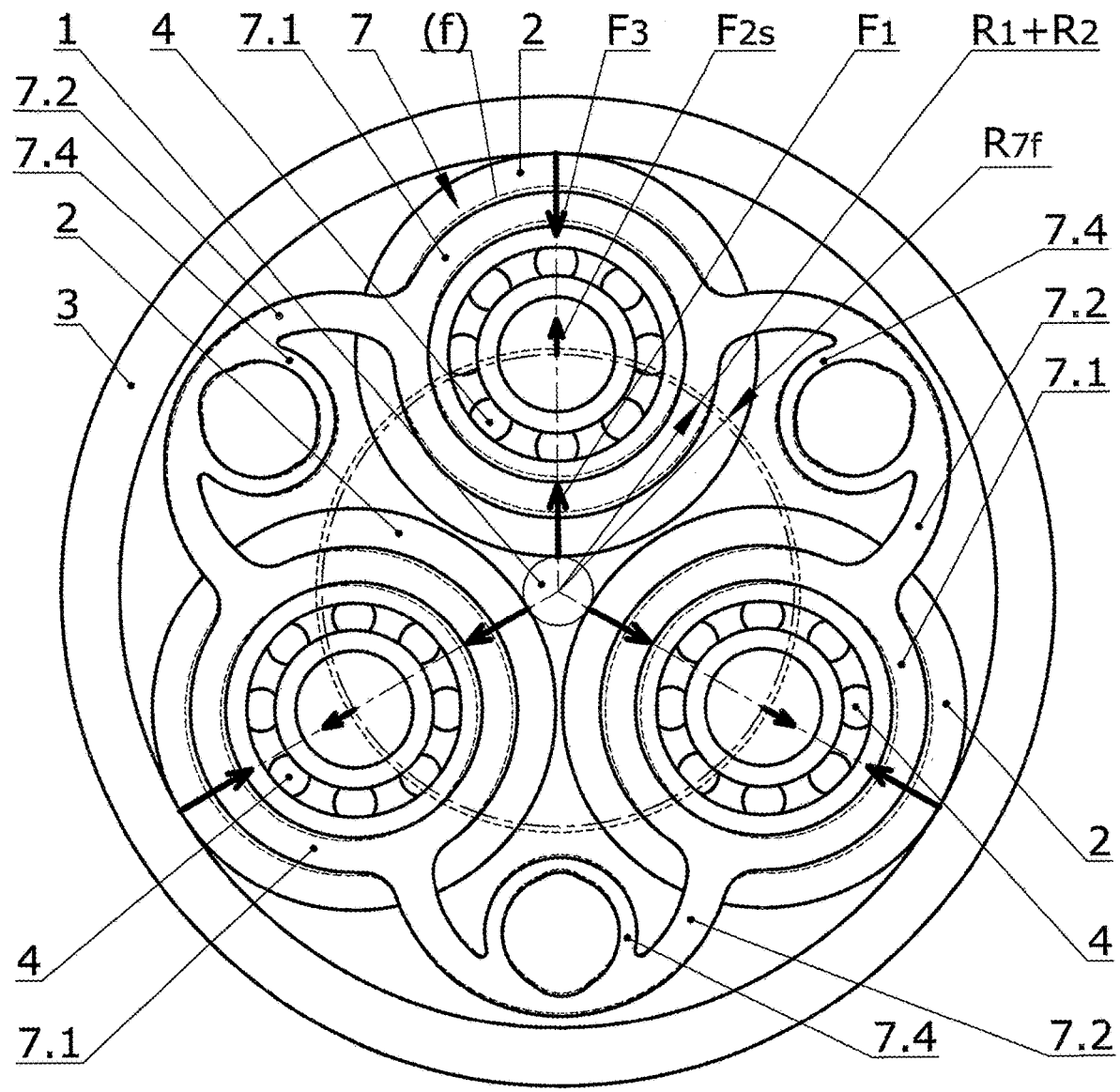
FIG. 10 is a frontal view of the major gear components detailing the emergence of additional radial forces towards the outer ring from the prestressing of the frame in the radial direction by the forced displacement of the cylindrical holes of the bearing slots during assembly for the first and the second embodiments of the invention.
Figure 11:
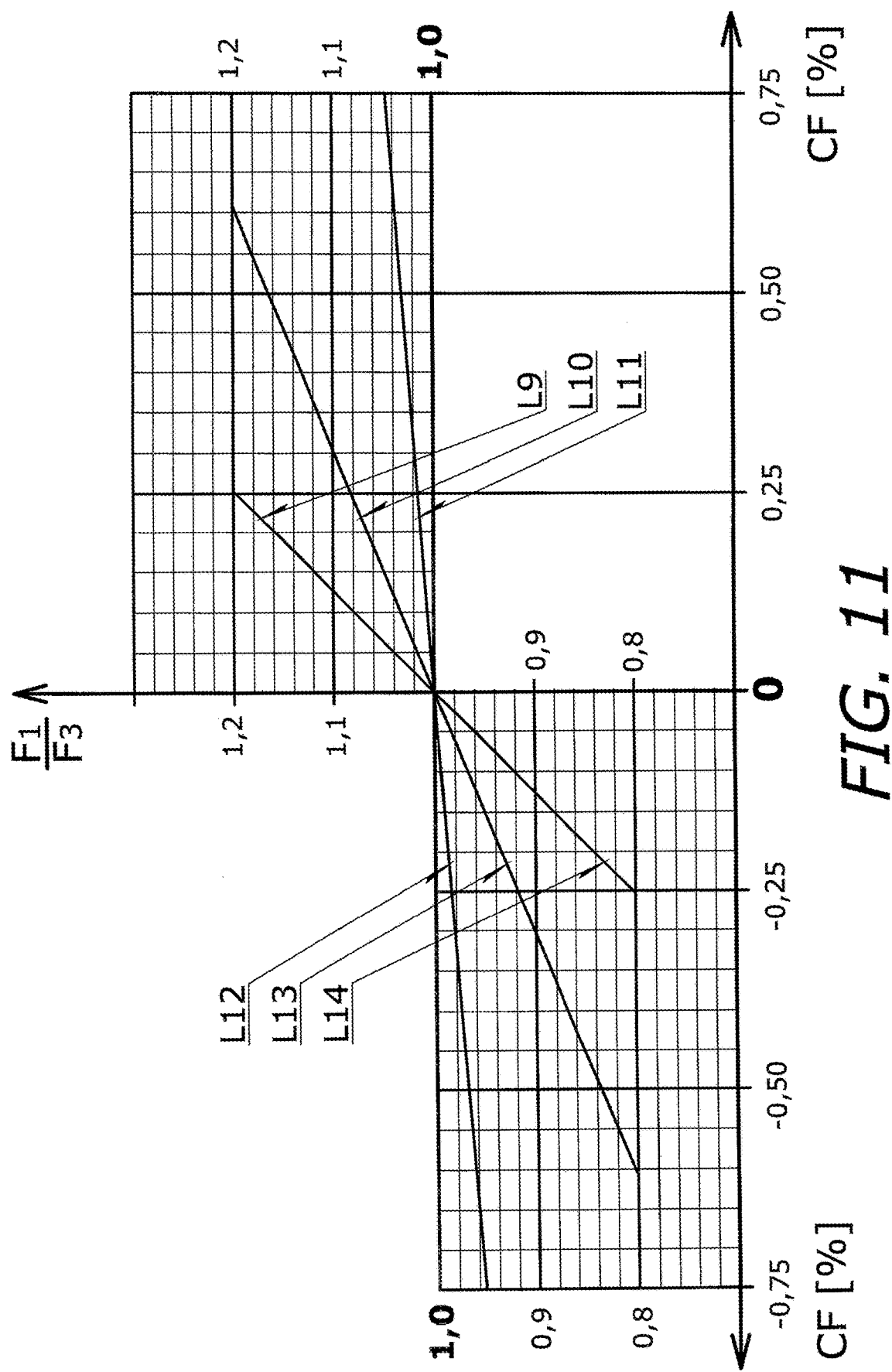
FIG. 11 is a nomogram showing the redistributed radial forces ratio depending on the degree and direction of prestressing of the frames in accordance with FIG. 9 and FIG. 10 for three reference values of the radial stiffness factor RSF for the first and the second embodiments of the invention.
Figure 13:
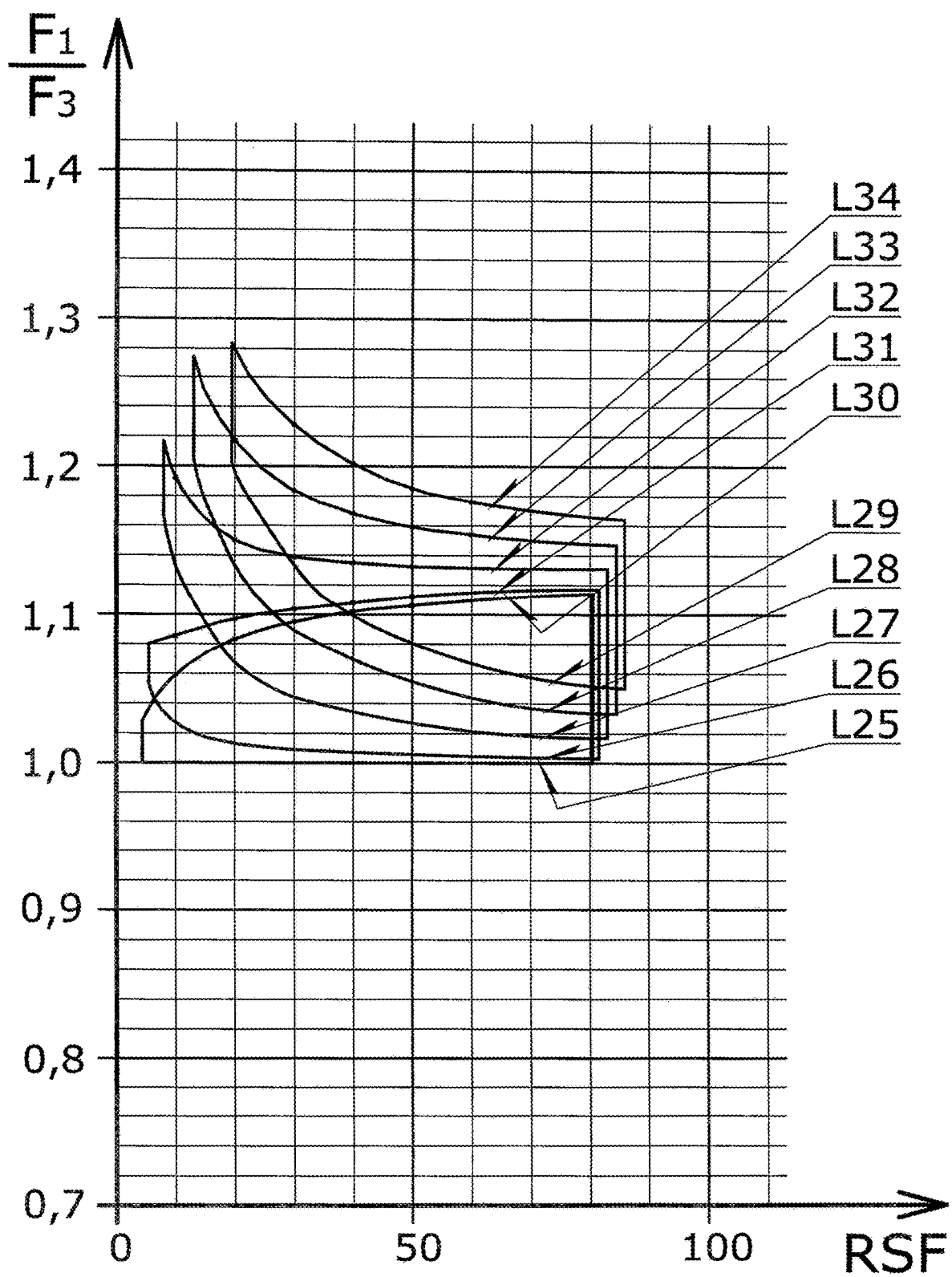
Figure 14:
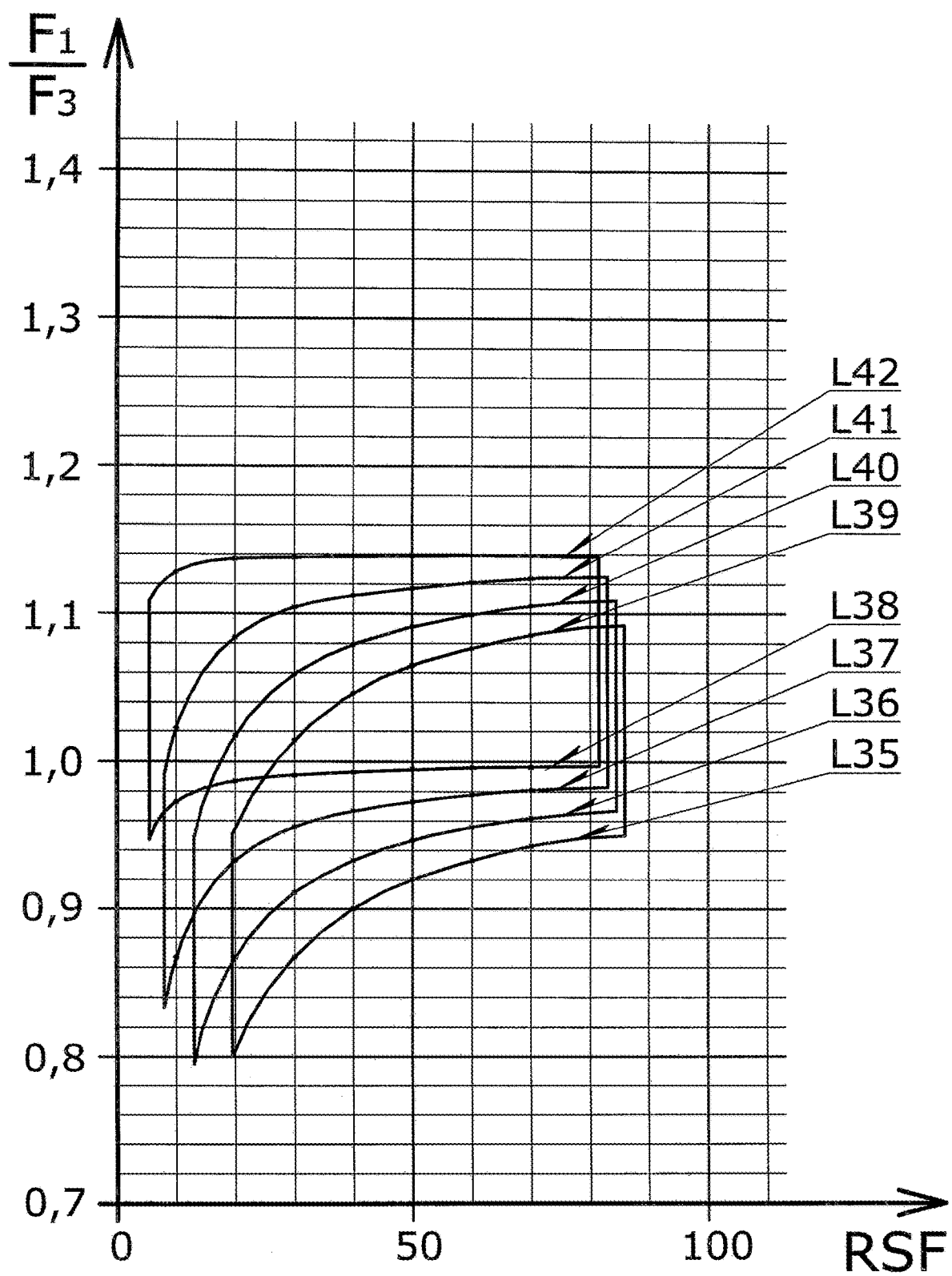
Figure 15:
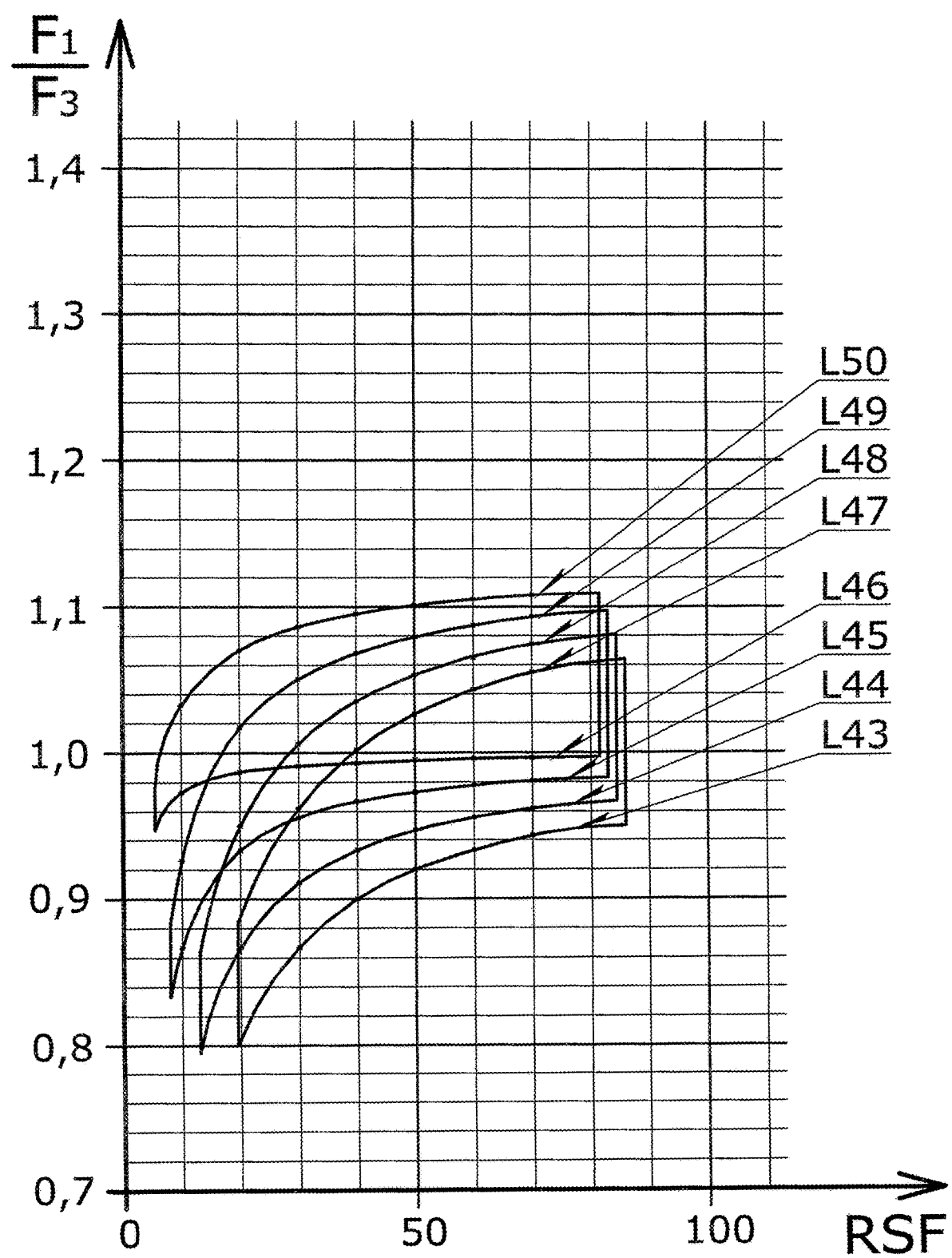

FIG. 13 is a nomogram that partially combines the nomograms on FIG. 7 and FIG. 11, showing the operational regions of the redistributed radial forces ratio for the second embodiment of the invention, with prestressing of the frame, corresponding to FIG. 9 as a function of the range of variation of the radial stiffness factor RSF in a non-stressed state and at four reference degrees of prestressing;

FIG. 14 is a nomogram that partially combines the nomograms on FIG. 7 and FIG. 11, showing the operational regions of the redistributed radial forces ratio for the first embodiment of the invention, with prestressing of the frame, corresponding to FIG. 10 as a function of the range of variation of the radial stiffness factor RSF for four different reference degrees of prestressing;

FIG. 15 is a nomogram that partially combines the nomograms on FIG. 7 and FIG. 11, showing the operational regions of the redistributed radial forces ratio for the second embodiment of the invention, with prestressing of the frame, corresponding to FIG. 10 as a function of the range of variation of the radial stiffness factor RSF for four different reference degrees of prestressing.

The first embodiment of the invention is shown on FIGS. 1, 2a, 3a, 3b, 4a, 4b, 5a and 5b. In accordance with the invention, the fixed-ratio planetary traction gear comprises a sun shaft 1, whose axis of rotation coincides with the principal longitudinal geometrical axis of the gear. The sun shaft 1 is in contact with the cylindrical rotation surfaces of at least three planet wheels 2 spinning around their axes which are equidistant from the sun shaft 1 and from one another. The axes of the planet wheels 2 are arranged along the lateral surface of an imaginary cylinder that is concentric to the sun shaft 1, and are parallel to its axis and to each other. Concentric to the sun shaft 1 is a rotating, radially-elastic outer ring 3 consisting of two sections with a cross section that changes in a step in the axial direction, which encompasses the planet wheels 2 and remains in constant contact between the internal lateral cylindrical surface of the section with the larger cross section and the rotational surfaces of the planet wheels 2 which are supported by ball bearings 4.

The rear housing 5, which has the shape of a disk with a central hole, through which the outer end of the sun shaft 1 passes through, is used to rigidly mount the support pillars 6, which have cylindrical shape and are spaced symmetrically between any two adjacent planet wheels 2. In the axial direction, on each side of the planet wheels 2 there is one identical, radially-elastic frame 7. Each of the frames 7 is secured in the axial direction by snap rings 8, with which it is in contact from the side of the planet wheels 2. From the opposite side, the frames are in contact with the following: one of the frames is in contact with the side face of the support plate 9, while the other frame is in contact with the side face of the rear housing 5. The support plate 9 is fixed rigidly to the support pillars 6 through holes that are coaxial to the pillars and placed in a concentric step with a diameter that is smaller than that of the support pillars 6, fixed axially to the above-described steps in the support pillars 6 with bolts 10. Attached to the rear housing 5 frontally with a rigid connection, is a front housing 11, encompassing the outer ring 3. The front housing 11 has bearing slots cut into it to accommodate the front bearings 12 which support the input shaft 13, which is coaxial to the axis of the sun shaft 1. Attached rigidly to the inner end of the input shaft 13 is a drive plate 14, which is affixed radially via a polygonal profile connection, such as square, and axially through a step with a larger diameter from the side of the rear housing 5 and a snap ring 15 from the side of the front housing 11. Inside the outer ring 3, in the section with the smaller cross section, from the side of the input shaft 13, there are two radially oriented opposing cylindrical, coaxial receptacle holes, through which, with a minimal functionally needed clearance, passes a drive pin 16, mounted rigidly, by press-fitting, for example, in the radially oriented receptacle holes of the drive plate 14, which are coaxial to the drive pins 16 and the openings in the outer ring 3.

The planet wheels 2 are supported radially by the coaxial to them cylindrical holes in the bearing slots 7.1 (FIG. 4*a*) and accommodate the coaxial bearings 4 of the planet wheels 2. Through the bridges 7.2, the bearing slots 7.1 are connected to the ears 7.4 (FIGS. 4*a* and 4*b*) of the frame 7 and to each other.

The frames 7 are restrained in the radial direction by their ears 7.4 (FIG. 4*b*), whose diameter is larger than the diameter of the support pillars 6 and get in contact with them eccentrically from the side that points to the outside of the gear. They are allowed to turn slightly (for example to 1° as of the axis of the sun shaft 1) in both directions in planes that are perpendicular to the principal axis and parallel to each other.

The journals 2.1 (FIG. 3*a*) of the planet wheels 2 are coaxial to them and are installed using a light interference bearing fit to the inner races 4.1 of the bearings 4. The outer races 4.2 of the bearings 4 are installed by a loose bearing fit, allowing minimal slip during operation to the cylindrical holes of the bearing slots 7.1 of the frames 7. The axial positioning of the planet wheels 2 (FIG. 2*a*) is ensured by the side contact between the outer races 4.2 of the bearings 4 and the side faces of, respectively, the rear housing 5 and the support plate 9. The axial length between the external side faces of the bearings 4 of the planet wheels 2 is shorter than the distance between the encompassing adjacent side faces of the rear housing 5 and the support plate 9, which provides minimal functionally needed clearance.

The radial positioning of the sun shaft 1 (FIG. 3*a*) is ensured by its linear contact with the planet wheels 2. The axial location of the sun shaft 1 (FIG. 2*a*) is ensured by the steps with larger diameter 17 and 18, giving the minimal functionally needed clearance to the side faces of the planet wheels 2 and limiting the displacement of the sun shaft 1 towards the front housing 11 or towards the rear housing 5.

The radial positioning of the outer ring 3 (FIG. 2*a*) is ensured by its linear contact with the planet wheels 2. The axial positioning of the outer ring 3 is ensured by the input shaft 13 which, registering against the drive pins 16 and the drive plate 14, determines the axial positioning of the outer ring 3 relative to the front housing 11 using the front bearings 12, which are secured axially in the steps of the bearing slots in the front housing 11. The axial positioning of the input shaft 13 in relation to the front bearings 12 is ensured via a step with a larger diameter for the input shaft 13 from the side of the rear housing 5, and via a larger diameter step from the front side of the input shaft 13, which is formed into a driving element mounted onto the input shaft 13, such as a pulley or a flange, which has not been depicted on the figure. Input shaft 13 is installed using an assembling process-adapted bearing fit, for example sliding or transitional in the inner races of the front bearings 12, whose outer races are installed using a loose bearing fit allowing minimal slip under operation inside their respective bearing slots in the front housing 11.

Figures 4A, 4B:
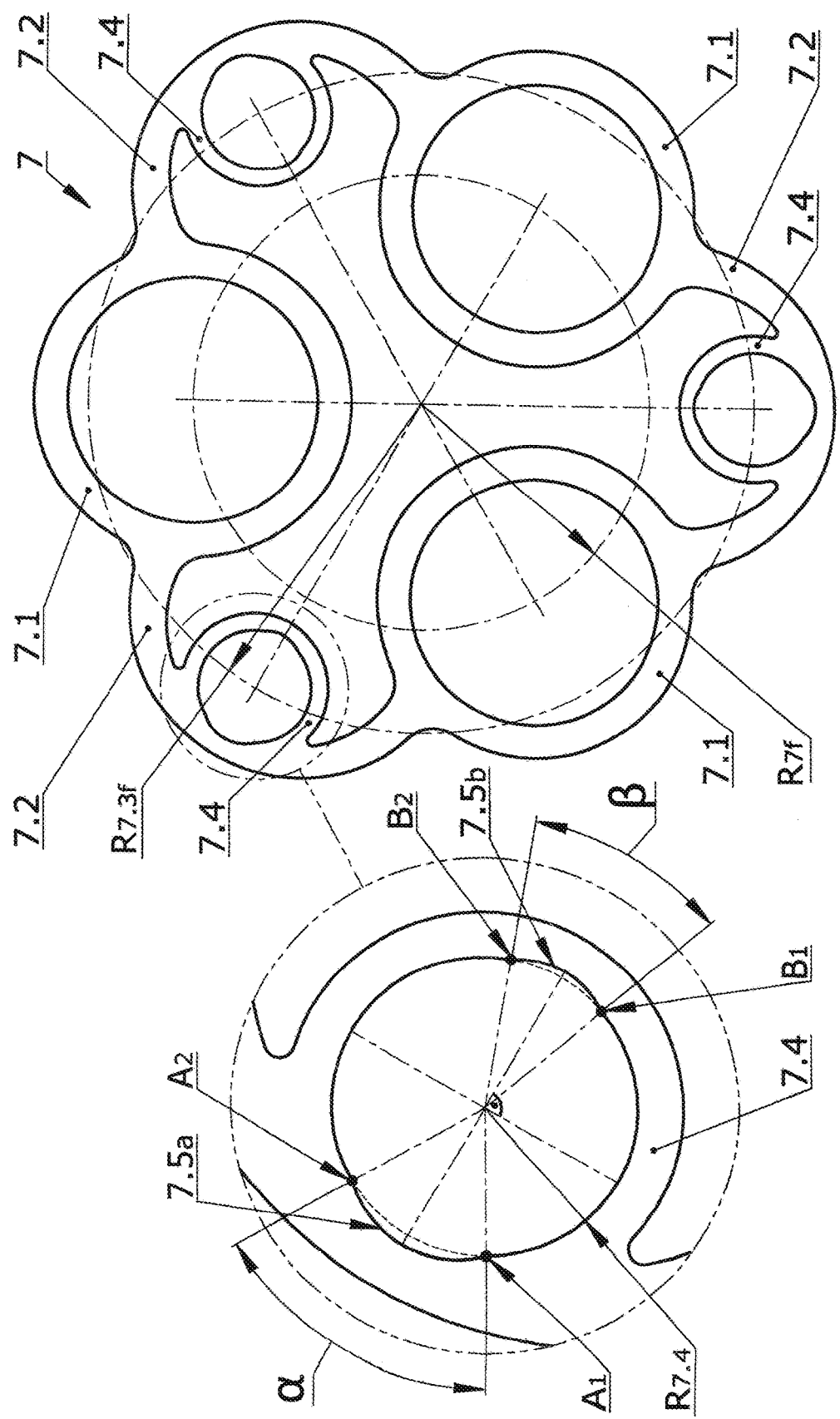
FIG. 4a is a frontal view of the frame.
FIG. 4b is a larger scale detailed view of the frame ear.

As shown on FIGS. 4*a* and 4*b*, the elastic frame 7 is a flat, planar element with a closed contour and constant thickness with at least three annular bearing slots 7.1 with cylindrical holes to accept the bearing 4 of the respective planet wheel 2. The axes of the annular bearing slots 7.1 are parallel to the axis of the sun shaft 1 and coincide with the axes of the planet wheels 2. The annular bearing slots 7.1 are positioned at equal distance from the center of the frame 7 and each two adjacent annular bearing slots 7.1 are connected with one another via a curvilinear bridge 7.2 on the interior surface of which (facing the center) there is an ear 7.4. In each ear 7.4 there is a cylindrical hole with a radius of $R_{7.4}$ to accept the respective support pillar 6. Inside each of the cylindrical holes with a radius of $R_{7.4}$ of the ears 7.4, in the radial direction there is a concave (as to the cylindrical surface) outer radial undercut 7.5*a* with a curvilinear shape and $A_1$-$A_2$ contour, limited by segment angle α.

Figures 3A, 3B:
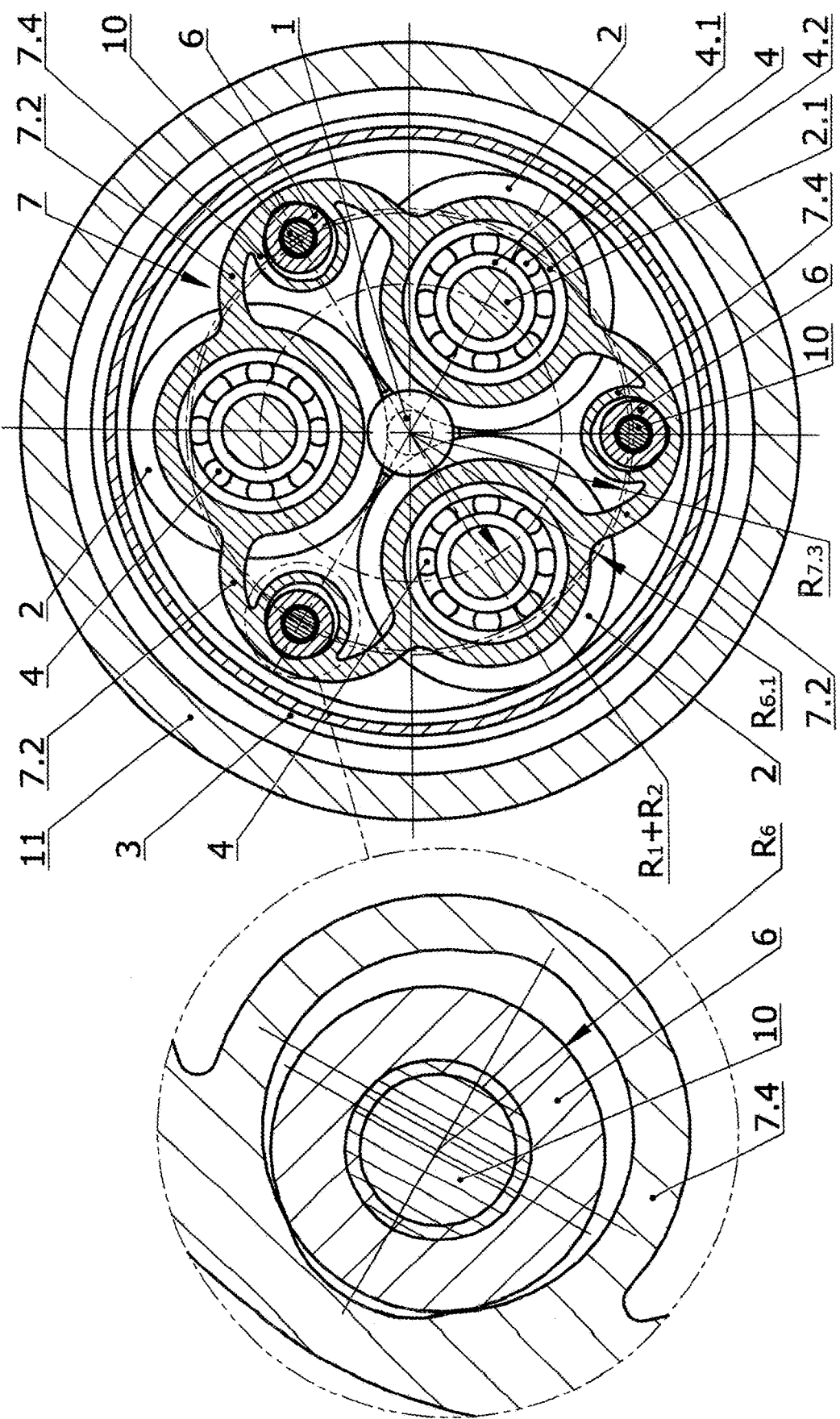

As shown in FIG. 3*a*, the axes of the planet wheels 2 are placed along a pitch circle radius of $R_1+R_2$ from the center of the gear where, respectively, $R_1$ is the traction surface radius of the sun shaft 1, and $R_2$ is the traction surface radius of the planet wheels 2. The axes of the support pillars 6 are placed along a pitch circle radius $R_{6.1}$ from the center of the gear, whereas the radius of the cylindrical lateral surface of each of the support pillars 6 is $R_6$. The cylindrical holes with a radius of $R_{7.4}$ (FIG. 4*b*) of the ears 7.4 of the frame 7 are placed along a pitch circle radius of $R_{7.3}$ from the center of the gear.

Figures 5A, 5B:
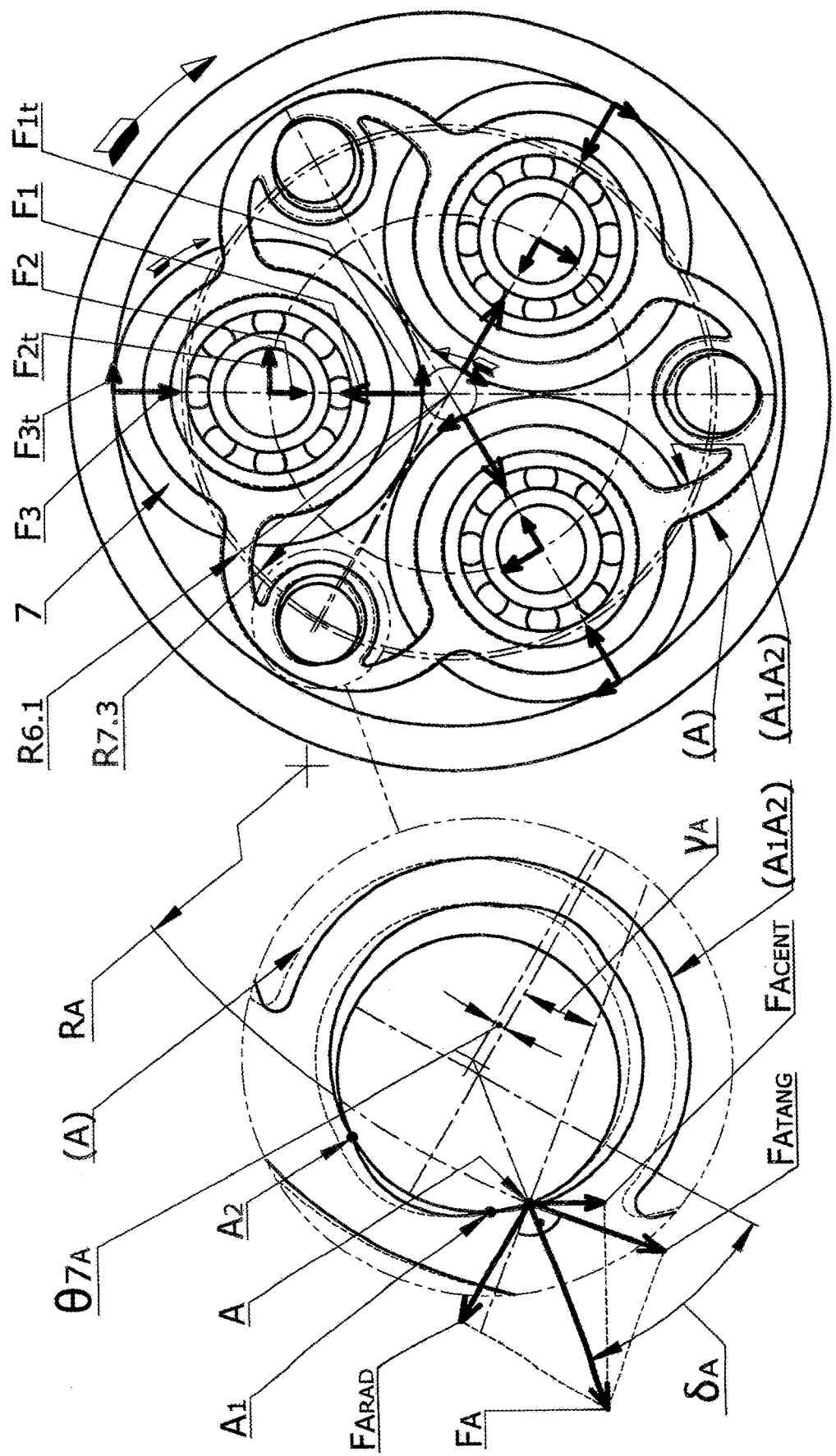
FIG. 5a is a frontal view of the main components of the gear for the first embodiment of the invention detailing the interacting forces under operation.
FIG. 5b is a larger scale detailed view of the contact area between the frame ear and the support pillar detailing the interacting forces under operation for the first embodiment of the invention.

As shown on FIGS. 3*a*, 3*b* and 4*b*, the pitch circle radius $R_{6.1}$ of the support pillars 6 is larger than the pitch circle radius $R_{7.3}$ of the cylindrical holes of the ears 7.4 of the frame 7, making sure there is contact between each cylindrical hole of each ear 7.4 with the respective support pillar 6 along the lines of $A_1$ and $A_2$, which in the frontal projections of FIGS. 4b and 5b are projected onto points $A_1$ and $A_2$.

The second embodiment of the invention is shown on FIGS. 4a, 4b, 6a and 6b.

Figures 6A, 6B:
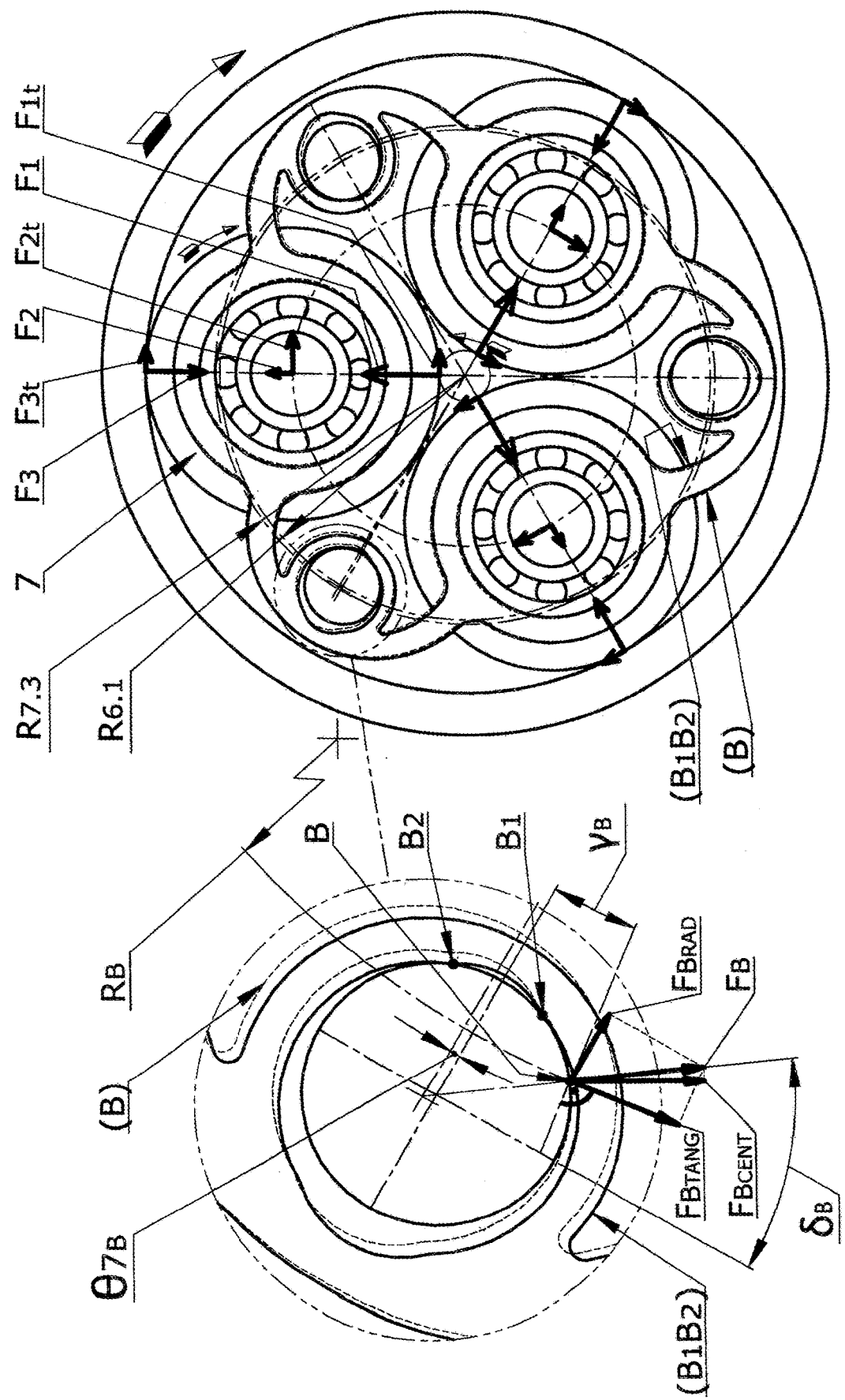
FIG. 6a is a frontal view of the main components of the gear for the second embodiment of the invention detailing the interacting forces under operation.
FIG. 6b is a larger scale detailed view of the contact area between the frame ear and the support pillar detailing the interacting forces under operation for the second embodiment of the invention.

As shown on FIGS. 6a and 6b, the second embodiment differs from the first embodiment in the fact that the support pillars 6 are located along pitch circle radius $R_{6.1}$, which is smaller than pitch circle radius $R_{7.3}$ of the cylindrical holes with a radius of $R_{7.4}$ (FIG. 4b) of the ears 7.4 of the frame 7 and as a result of this the cylindrical hole of each ear 7.4 of the frames 7 is in contact with its respective support pillar 6 from the internal (as of the center of the gear) side providing an eccentric contact between the support pillars 6 and the cylindrical holes of the ears 7.4 of the frame 7 along the lines of $B_1$ and $B_2$ of the ears 7.4, which in the frontal projections of FIGS. 4b and 6b are projected onto points $B_1$ and $B_2$.

In each cylindrical hole with a radius $R_{7.4}$ of the ears 7.4 of the frame 7 in the radial direction, there is a concave (to the cylindrical surface) inner radial undercut 7.5b with a curvilinear shape and a contour $B_1$-$B_2$, limited by segment angle β.

In order to improve the uniformity of the designs and reduce the nomenclature of individual gear components, in accordance with the invention, it is possible for the cylindrical hole in the ears 7.4 to incorporate simultaneously both—outer 7.5a and inner 7.5b—radial undercuts defined by the curvilinear sections $A_1$-$A_2$ and $B_1$-$B_2$ and their respective segment angles α and β.

It is possible in both the first and the second embodiments of the invention the cylindrical holes in the ears 7.4 of the frame 7 to be made without radial undercuts, shifting the line of contact with the cylindrical holes in the ear 7.4 of the frame 7 to the farthest section of the cylindrical hole of the ear 7.4, as viewed from the center of the gear, in the first embodiment, and to the nearest section of the cylindrical hole of the ear 7.4, as viewed from the center of the gear, in the second embodiment of the invention.

Figure 1:
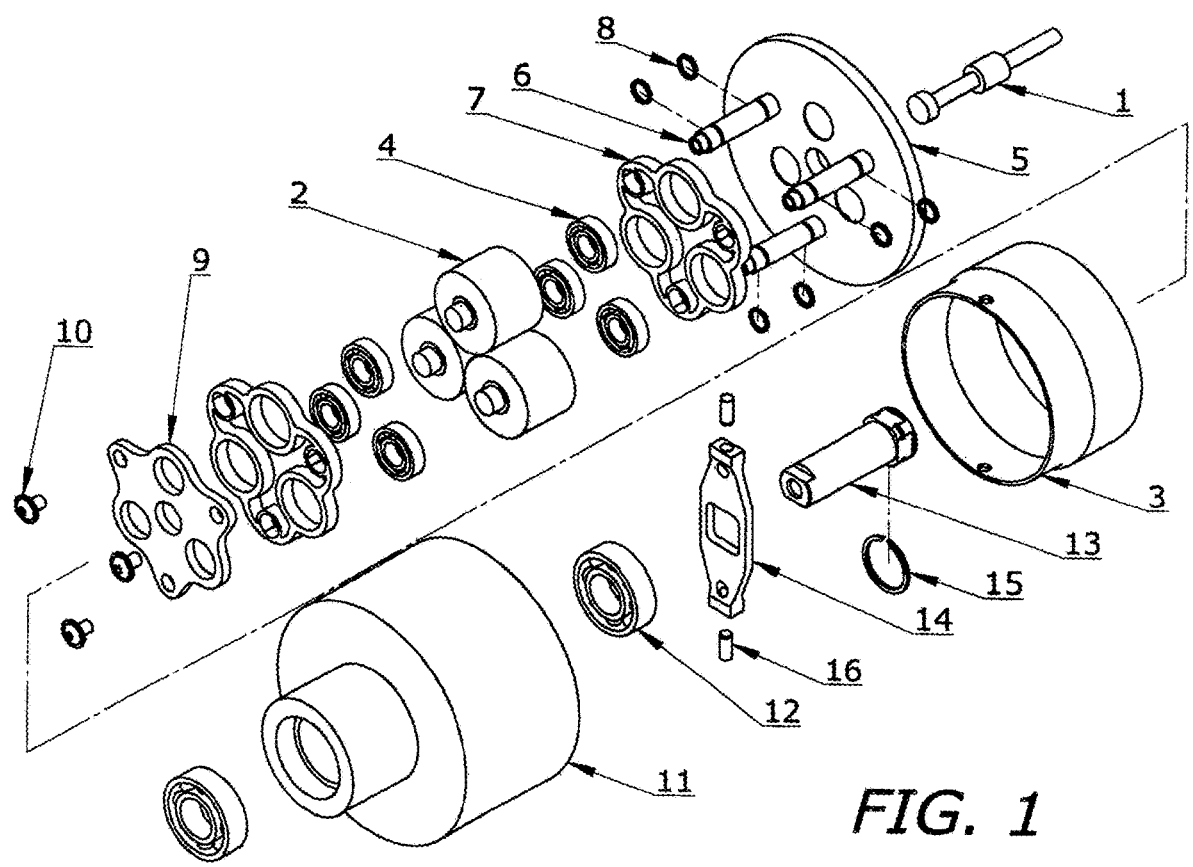
FIG. 1 is an isometric exploded view of the planetary gear showing all components of the first embodiment of the invention.
Figure 2A:
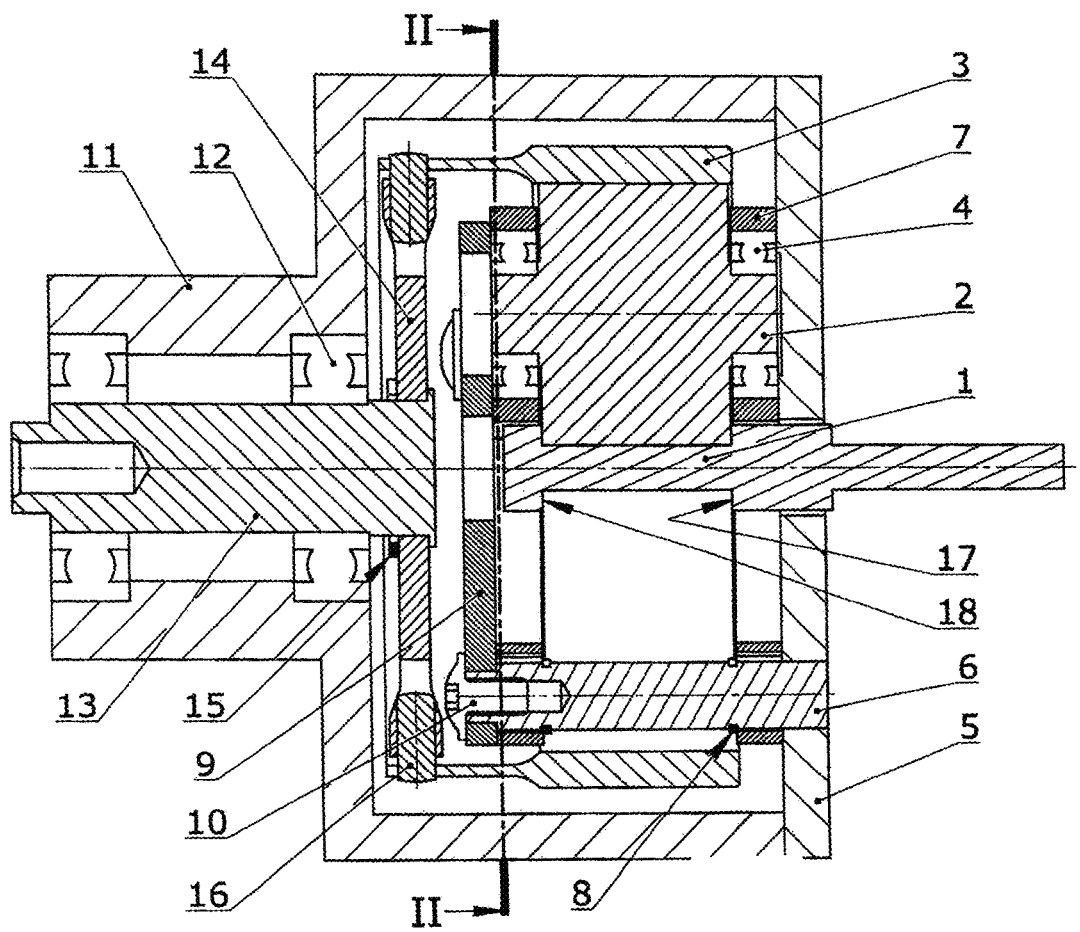
FIG. 2a is a longitudinal section view along the principal vertical plane of symmetry of the gear in the first embodiment of the invention.
Figure 2B:
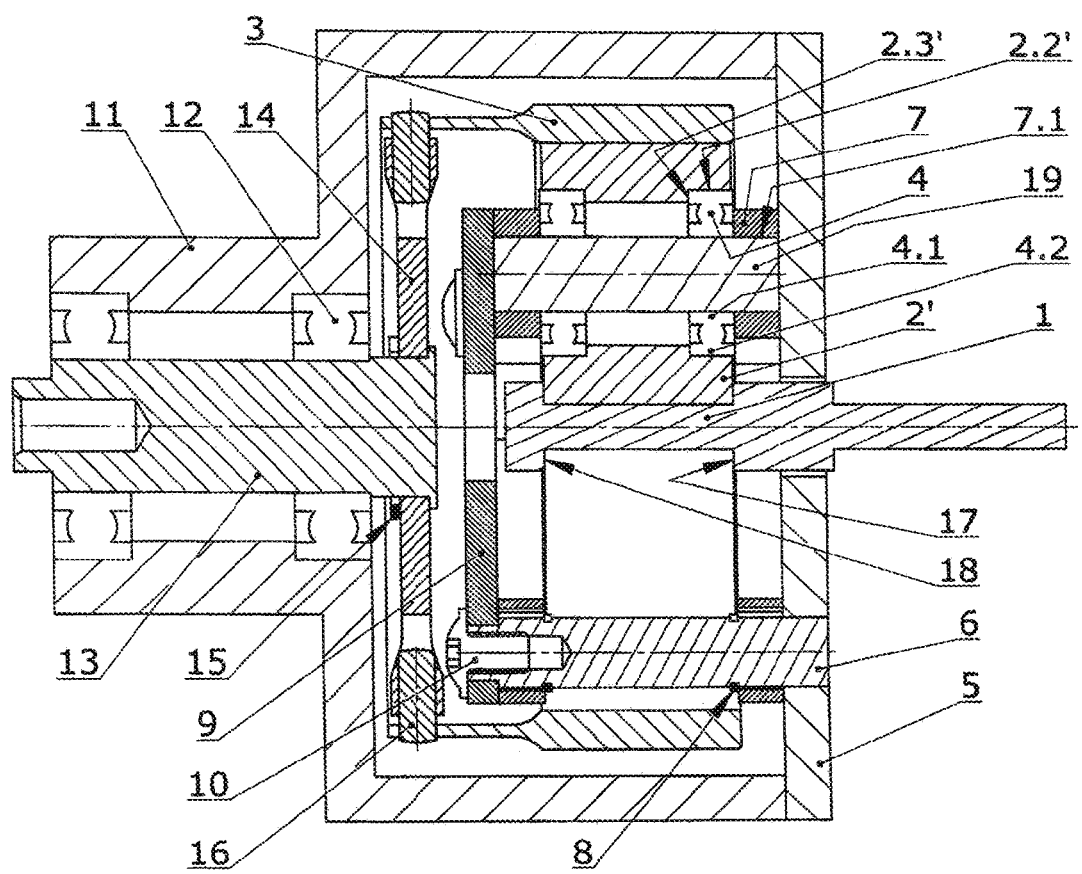
FIG. 2b is a longitudinal section view along the principal vertical plane of symmetry of the gear detailing an alternative bearing arrangement of the planet wheels, applicable to both the first and the second embodiment of the invention.

The third embodiment of the fixed ratio planetary traction gear is shown on FIG. 2b. This embodiment uses a different bearing arrangement for its planet wheels 2', which includes a center bore which is coaxial to the surface of rotation. Shaped in the center bore are bearing slots 2.2', each with a step 2.3', restraining in axial direction the bearings 4 of the planet wheels 2' whose outer races 4.2 make contact with the frontal face of the steps 2.3'. With this type of bearing arrangement, the cylindrical holes of the bearing slots 7.1 of the frame 7 have a nominal diameter reflecting the nominal diameter of the inner races 4.1 of the bearings 4 and the bearing slots 7.1 of every frame 7 accommodate a fixed and coaxial to them axle 19, which supports the inner races 4.1 of the bearings 4 installed with a loose bearing fit allowing minimal slip under operation. The outer races 4.2 of the bearings 4 are installed with a light interference bearing fit inside the bearing slots 2.2'. The axial anchoring of the planet wheels 2' is secured in every direction between the fixing steps in each direction 2.3' and the contact of the inner races 4.1 of the bearings 4 with the side face of the respective bearing slots 7.1 of the frames 7. The frames 7 touch the side faces of the rear housing 5 and the support plate 9. The distance between the side faces of the frames 7 from the side facing the planet wheels 2' is greater than the distance between the side faces of the inner races 4.1 of the bearings 4, ensuring minimal functionally needed clearance to guarantee that the bearings 4 are not axially tensioned when they are static. The distance between the side faces of the frames 7 from the side of the wall they are in contact with respectively with the side faces of the rear housing 5 and support plate 9 is smaller than the distance between the rear housing 5 and the plate 9, creating a minimal functionally needed clearance to guarantee that the frames 7 are allowed to shift their positions in the radial direction under operation. The side faces of the axles 19 do not need to touch the respective side faces of the rear housing 5 and the support plate 9.

USE OF THE INVENTION

The operation of the fixed-ratio planetary traction gear, in accordance with the first embodiment of the invention, is the following:

When the planet gear is in a static state, the planet wheels 2 are subjected to radial forces $F_3$ (FIG. 5a) of the elastic radial pre-stretching of the outer ring 3 in its assembling process onto the planet wheels 2. The forces $F_3$ are balanced by the equal forces acting in mutually opposing directions $F_1$ in the sun shaft 1. In the static state of the gear, the cylindrical holes of the ears 7.4 of the frame 7 are touching the support pillars 6 along the lines of $A_1$ and $A_2$ (FIG. 5b). The static state of the gear displayed on FIGS. 5a and 5b corresponds to contours ($A_1A_2$) of the frame 7, depicted with solid lines.

When the outer ring 3 is rotated by the input shaft 13 via the drive plate 14 and the drive pins 16 (FIG. 2a и 2b), the traction between the outer ring 3, the planet wheels 2, and the sun shaft 1, generates tangential driving forces $F_{3t}$ (FIGS. 5a and 6a) in the outer ring 3 and tangential reactions Flt in the sun shaft 1, which act on the planet wheels 2 simultaneously. The resultant tangential forces Flt in the planet wheels 2, which are the sum of the two, act on the bearings 4, generating torque $T_7$ on each of the two frames 7, which turns the frames 7 together with the planet wheels 2 and their bearings 4 at a small angle $\theta_{7A}$ (FIG. 5b), below one degree, around the axis of the planetary gear, breaking the contact along the $A_2$ lines and shifting the contact along the $A_1$ line to the A line. Due to the eccentric contact between the cylindrical holes of the ears 7.4 and the support pillars 6, the rotation of the frames 7 at an angle $\theta_{7A}$ shifts the ears 7.4 radially away from the center of the gear. The position of the frame 7 after it has been turned at an angle $\theta_{7A}$ is shown with contours (A), depicted with dashed lines in FIGS. 5a and 5b.

The torque $T_7$ acting on each of the frames 7 is counteracted by the tangential component $F_{A_{TANG}}$ (FIG. 5b) of the normal reaction $F_A$ in the support pillars 6, acting on the cylindrical holes of the ears 7.4 of the frame 7 at pitch circle radius $R_A$. The radial component $F_{A_{RAD}}$ of the normal reaction $F_A$ is counteracted by the elastic force generated by the bending in the bridges 7.2 of the frame 7 caused by the radial displacement of the ears 7.4 once the frame 7 has been turned at an angle $\theta_{7A}$.

For a comprehensive description of the operation of all embodiments of the invention, the values of parameters such as radial stiffness factor RSF, eccentricity ECC, activation torque threshold ATT and concentricity factor CF have been defined and explained below in conjunction with the figures elaborated to clarify the use of the invention.

The radial stiffness factor RSF is a dimensionless quantity defined as the ratio between the radial stiffness $K_3$ of the outer ring 3, which exerts a radial compression force once it has been pre-stretched radially during its installation over the planet wheels 2, and the radial stiffness $K_7$ of the frame 7:

$$RSF = \frac{K_3}{K_7} \quad (1)$$

The radial stiffness $K_3$ of the outer ring 3 is measured in N/m and is defined as the radial displacement of each of the lines of contact of the inner traction surface of the outer ring 3 under the influence of three equidistant radial forces with equal magnitude generated by the contact with the planet wheels 2 and acting on the line of contact in direction away from the center of the outer ring 3.

The radial stiffness $K_7$ of the frame 7 is measured in N/m and is defined as radial displacement of the axis of each of the cylindrical holes of the bearing slots 7.1 under the influence of three radial forces equal in their magnitude generated at the bearings 4 and acting away from the center of the frame 7. RSF varies in the range between 5 and 100. For example, in the readings on FIG. 4a for the frame 7 and the readings on FIG. 2a, 2b and FIG. 3a for the outer ring 3 at pitch circle radius $R_1+R_2$ of the planet wheels 20.5 mm, RSF is about 5 when the frame 7 is made of carbon steel, and about 15 when the frame 7 is made of aluminum alloy. The values have been determined based on theoretical calculations and have been verified by computer aided simulations using the finite element method.

To decrease the radial stiffness $K_7$ of the frames 7 and to achieve higher RSF values for a selected outer ring 3, the cross-sectional area of the bridges 7.2 of the frame 7 is decreased in the section between the bearing slots 7.1 and the ears 7.4.

Eccentricity ECC is defined as the difference between the radius $R_{7.4}$ of the cylindrical part of the ears 7.4 of the frame 7 and the radius $R_6$ of the support pillars 6:

$$ECC = R_{7.4} - R_6 \, m \quad (2)$$

ECC is between 0.1% and 4% of the pitch circle radius $R_1+R_2$ of the planet wheels 2, whereas the choice of value is tied to the choice of RSF. For example, larger RSF figures require lower ECC values and vice versa.

Because of the correlation between the rotation angle $\theta_{7A}$ of the frame 7, the contact angle $\delta_A$ and the contact displacement angle $\gamma_A$ (FIG. 5b) of the cylindrical hole of the ear 7.4 of the frame 7, at force equilibrium the following equation system applies:

$$T_7 = \tfrac{1}{2} \cdot 3 \cdot F_{2i} \cdot (R_1 + R_2) = 3 \cdot F_{A_{TANG}} \cdot R_A \, Nm \quad (3)$$

$$F_{A_{TANG}} = F_A \cdot \cos(\delta_A + \gamma_A) N \quad (4)$$

$$F_{A_{RAD}} = F_A \cdot \sin \delta_A \, N \quad (5)$$

$$F_{A_{RAD}} \cong K_7 \cdot ECC \cdot (1 - \sin \delta_A) N \quad (6)$$

At force equilibrium, in operation, the normal reaction $F_A$ in the support pillars 6 has a component, $F_{A_{CENT}}$, which is parallel to the direction of the force $F_3$ from the outer ring 3 and acts in the same direction:

$$F_{A_{CENT}} = F_A \cdot \cos(\delta_A + 30°) N \quad (7)$$

According to the radial load theory for elastic hoop ring structures, which also applies to the principle of creating radial forces $F_3$ in the outer ring 3, the internal beam strain due to bending in the bridges 7.2 generates radial forces $F_2$ acting through the cylindrical holes of the bearing slots 7.1 of the frame 7 on the bearings 4 and the planet wheels 2 in the direction of the expected displacement, which, for the depicted loading layout, is toward the sun shaft 1, and are self-balanced at the linear contacts between the planet wheels 2 and the sun shaft 1. The supplementary radial force $F_2$ (FIG. 5a) is calculated using the following approximated formula:

$$\frac{F_2}{F_{A_{RAD}}} \cong \frac{R_1 + R_2}{R_A} \quad (8)$$

The total radial force $F_1$ in the sun shaft 1, balancing the radial forces of the outer ring 3 and the two frames 7, is calculated as follows:

$$F_1 = F_3 + (2 \cdot F_2) + (2 \cdot F_{A_{CENT}}) N \quad (9)$$

The explanation above shows that, during operation, the ratio between the radial forces $F_1/F_3$ changes depending on the transferred torque fluctuating between 1, in the static state, and approximately 1.16, for frames with high radial stiffness $K_7$ while transferring the maximum possible amount of torque before reaching the slip limit along the lines of contact between the outer ring 3 or the sun shaft 1 and the planet wheels 2.

The operation of the fixed-ratio planetary traction gear as presented in the second embodiment of the invention is illustrated on FIGS. 6a and 6b and is similar to what is described for FIGS. 5a and 5b with regards to the first embodiment. In the static state of the gear, the cylindrical holes of the ears 7.4 of the frame 7 are in contact with the support pillars 6 along the $B_1$ and $B_2$ lines. This state of the gear is illustrated on FIG. 6b with the contours depicted with solid lines $(B_1 B_2)$. When the outer ring 3 is rotated, the torque $T_7$ exerted on each of the two frames 7 turns them at a slight angle $\theta_{7B}$, for example below 1 degree, around the axis of the planetary gear, breaking their contact along the $B_2$ lines and shifting the contact from the $B_1$ to the B lines, which causes a simultaneous radial displacements of the ears 7.4 towards the center of the gear into position (B), the contours of which are depicted with dashed lines. Depicted on FIG. 6a with solid $(B_1 B_2)$ and dashed lines (B) are the contours of the frame 7 in static state and in operation, respectively.

The torque $T_7$ applied to each of the frames 7 (FIG. 6b) is counteracted by the tangential component $F_{B_{TANG}}$ of the normal reaction $F_B$ in the support pillars 6, acting on the cylindrical holes of the ears 7.4 of the frame 7 at the pitch circle radius $R_B$. The radial component $F_{B_{RAD}}$ of the normal reaction $F_B$ is counteracted by the elastic force generated by the bending of the bridges 7.2 during the radial displacement of the ears 7.4 towards the center of the gear once the frame 7 has been turned at an angle $\theta_{7B}$.

The radial and the tangential forces between the outer ring 3, the planet wheels 2 and the sun shaft 1 (FIG. 6a) are identical to the correlation already explained for the first embodiment of the invention (FIG. 5a) with the sole exception that the supplementary radial force $F_2$ here acts in the opposite direction, i.e. away from the center of the gear.

Because of the correlation between the rotation angle $\theta_{7B}$ of the frame 7 with the contact angle $\delta_B$ and the contact displacement angle $\gamma_B$ (FIG. 6b), the following equation system is valid at force equilibrium:

$$T_7 = \tfrac{1}{2} \cdot 3 \cdot F_{2i} \cdot (R_1 + R_2) = 3 \cdot F_{B_{TANG}} \cdot R_B \, Nm \quad (10)$$

$$F_{B_{TANG}} = F_B \cdot \cos(\delta_B - \gamma_B) N \quad (11)$$

$$F_{B_{RAD}} = F_B \cdot \sin \delta_B N \quad (12)$$

$$F_{B_{RAD}} \cong K_7 \cdot ECC \cdot (1 - \sin \delta_B) N \quad (13)$$

At force equilibrium, under operation, the normal reaction $F_B$ in the support pillars 6 has a component $F_{B_{CENT}}$ which is parallel to the force F3 of the outer ring 3 and acts in the opposite direction:

$$F_{B_{CENT}} = F_B \cdot \cos(\delta_B - 30°) N \quad (14)$$

The supplementary radial force $F_2$ acts in the direction of the expected displacement, which in the described case is away from the center of the gear. It is calculated using the following approximated formula:

$$\frac{F_2}{F_{B_{RAD}}} \cong \frac{R_1 + R_2}{R_B} \quad (15)$$

The total radial force $F_1$ in the sun shaft 1, balancing the radial forces of the outer ring 3 and the two frames 7, is calculated as follows:

$$F_1 = F_3 - (2 \cdot F_2) + (2 \cdot F_{B_{CENT}}) N \quad (16)$$

In the second embodiment of the invention, under operation, the ratio between the radial forces $F_1/F_3$ changes less than in the first embodiment of the invention fluctuating between 1, in the static state, and about 1.124 for frames with a lower radial stiffness while transferring the maximum possible torque before reaching the slip limit.

FIG. 7 is a nomogram showing graphically the correlation between the radial force ratio $F_1/F_3$ for the first and the second embodiments of the invention depending on the torque being transferred for three reference values of the RSF.

It is known from theory that the traction coefficient is a key parameter for the functioning of traction gears and its maximum value determines the maximum tangential forces which the driving component could transfer to the driven component. In accordance with the theoretical definition, the traction coefficient represents the ratio between the maximum tangential force with which the driving component impacts the driven component for a known normal to the surface reaction force before starting a relative skid. In the context of planetary traction gears, this is the ratio between the maximum tangential driving force Fat applied to the outer ring 3 and the radial elastic force $F_3$ created by it, or $F_{3t}/F_3$.

Modern traction transmission fluids, such as for example the SANTOTRAC 50 Traction Fluid manufactured by the American company, SANTOLUBES LLC, provide an average traction coefficient of 0.1. For this reason, this value has been accepted as the maximum in the nomogram on FIG. 7, featuring the L1, L2, L3, L4, L5 and L6 lines. Lines L1, L2 and L3 belong to the first embodiment (FIGS. 5*a* and 5*b*), while lines L4, L5 and L6 belong to the second embodiment (FIGS. 6*a* and 6*b*) of the invention. Lines L1 and L6 represent an RSF equal to 8. Lines L2 and L5 represent an RSF of 16. Lines L3 and L4 represent an RSF of 80.

The nomogram shows that when using relatively elastic frames 7 the differences between the first and the second embodiment of the invention are not large. However, if relatively stiff frames are used instead, the differences become considerable. The lines have been determined theoretically in accordance with the mathematical apparatus described above.

Because of the eccentric contact of the cylindrical holes of the ears 7.4 of the frames 7 with the support pillars 6, at low values of the torque applied on the frames 7 (torque $T_7$) due to the considerable initial values of contact angles $\delta_A$ (FIG. 5*b*) and $\delta_B$ (FIG. 6*b*) during the static state, the frames 7 are very sensitive to their rotation angles $\theta_{7A}$ (FIG. 5*b*) or $\theta_{7B}$ (FIG. 6*b*). In other words, when relatively small torques $T_7$ are applied, the frames 7 react with comparatively large rotation angles because the radial displacement of the ears 7.4 of the frames 7, along with the radial elastic force generated in the bridges 7.2 due to their bending, increases also relatively slowly. At low loads and especially with torsional vibrations in the input shaft 13 such as, for example under idle speed operation of a single cylinder internal combustion engine with a planetary gear connected to its crankshaft, the frames 7 are likely to react to these vibrations without it being functionally necessary. To limit the frames' 7 high torsional sensitivity to turn under low loads, an activation torque threshold ATT is introduced, under which the frames 7 remain stationary, not reacting to the torque $T_7$ applied to them. ATT is defined as the ratio between the highest value of the transferred torque, at which the frames 7 still remain stationary, and the maximum possible torque which the gear can transfer before reaching the slip limit for its components, expressed as a percentage. When using traction fluids with a traction coefficient of 0.1, the recommended value of ATT is between 0% and 5%. If a traction fluid of a different traction coefficient is used, ATT will change.

Adjusting ATT for a selected radial stiffness $K_7$ of the frame 7 is achieved by simultaneous control of the segment angle $\alpha$ for the first or segment angle $\beta$ for the second embodiment of the invention (FIG. 4*b*) and the pitch circle radius $R_{7.3f}$ (FIG. 4*a*) in the free (unassembled) state of the cylindrical holes of the ears 7.4 of the frame 7.

Figure 8:
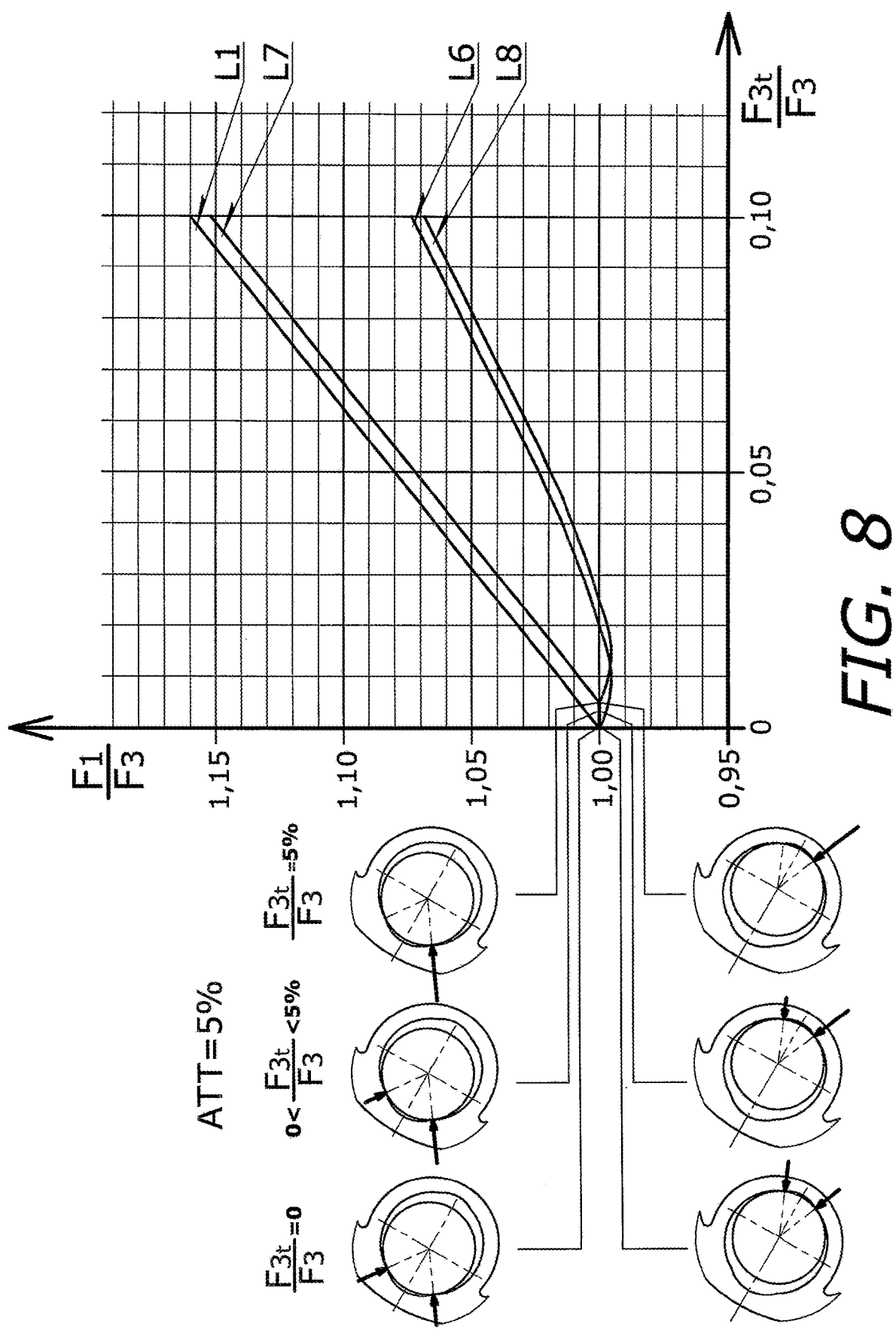
FIG. 8 is a nomogram showing the impact of the activation torque threshold ATT on selected curves of the nomogram on FIG. 7.

Lowering the pitch circle radius $R_{7.3f}$ of the frames 7 in their free (unassembled) state to below the pitch circle radius $R_{7.3}$, at which the cylindrical holes of the ears 7.4 are located after assembly, prestresses the bridges 7.2 of the frame 7 radially in the area of the lines of contact ($A_1$ and $A_2$ for the first and $B_1$ and $B_2$ for the second embodiments of the invention). Because of the internal bending stresses in the bridges 7.2, this creates normal static reactions in the lines of contact between the cylindrical holes of the ears 7.4 of the frame 7 and the support pillars 6 in the static state of the gear. These normal static reactions, which are equal to one another, are shown schematically on the side of the nomogram on FIG. 8. When the driving torque is increased gradually, the reactions in the lines $A_2$ and $B_2$ (FIGS. 5*b* and 6*b*) respectively start to gradually decrease while those at the $A_1$ and $B_1$ start to increase. Upon reaching the ATT, which in the nomogram on FIG. 8 is adjusted at 5%, the lines $A_2$ and $B_2$ respectively no longer contact the support pillars 6 causing the driving torque to be counteracted only by the normal reactions in the lines $A_1$ and $B_1$ respectively. Upon a subsequent increase in the driving torque, the lines of contact are shifted to A and B respectively and the ears 7.4 begin to move radially.

Decreasing the pitch circle radius $R_{7.3f}$ (FIG. 4*a*) in the free (unassembled) state of the cylindrical holes of the ears 7.4 of the frame 7 at the time of introducing ATT changes within the range of 0.03% to 0.3% of the pitch circle radius $R_1 + R_2$ of the planet wheels 2, while segment angles $\alpha$, $\beta$ change within the range of 10° to 90° and 10° to 70° respectively. Choosing the values of the pitch circle radius $R_{7.3f}$ and the segment angles of $\alpha$ or $\beta$ is done in conjunction with the chosen values of ECC and RSF.

The nomogram on FIG. 8 shows the change in the ratio between the radial forces $F_1/F_3$ of the first and the second embodiments of the invention depending on the torque being transferred $F_{3t}/F_3$ following the introduction of the maximum recommended ATT at 5% with RSF equal to 8. Lines L1 and L6 are transferred from the nomogram shown on FIG. 7 and are not subjected to ATT. Lines L7 and L8 represent (respectively) the change in lines L1 and L6 after the introduction of ATT at 5%. Lines L7 and L8 are determined theoretically in accordance with the mathematical apparatus described above.

FIGS. 9 and 10 show in an exaggerated graphical scale the mechanism that generates the initial static loading (FIG. 9) or unloading (FIG. 10) of the sun shaft 1 with radial forces at the expense of installing frames 7 in a prestressed state created by forced bending of the bridges 7.2 of the frame 7 while assembling the gear in the cases where the pitch circle radius $R_{7f}$ in the free (unassembled state) of the cylindrical holes of the bearing slots 7.1 of the frame 7 (FIG. 4a) it is purposefully designed to be smaller (FIG. 9) or larger (FIG. 10) of the pitch circle radius $R_1+R_2$ of the planet wheels 2.

The mechanism which creates the initial static loading (FIG. 9) or unloading (FIG. 10) of the sun shaft 1 with radial forces created by the prestressing of the frames 7 functions virtually independently from the mechanism for loading the sun shaft 1 under operation described in FIGS. 5a, 5b, 6a, 6b, 7 and 8 since it is controlled by a different design dimension, namely the pitch circle radius $R_{7f}$ in the free (unassembled) state of the cylindrical holes of the bearing slots 7.1 of the frame 7.

The pitch circle radius $R_{7f}$ in the free (unassembled) state of the cylindrical holes of the bearing slots 7.1, which controls the static loading (FIGS. 4a and 9) or unloading (FIGS. 4a and 10) of the sun shaft 1 and the pitch circle radius $R_{7.3f}$ in the free (unassembled) state of the cylindrical holes of the ears 7.4 of the frame 7, which controls ATT (FIGS. 4a and 8), are correlated and are both subject to the principles of stressing elastic hoop ring structures. In this sense, when the bearing slots 7.1 are forced away from the center of the gear, the expected displacement of the ears 7.4 is towards the center. Consequently, the combined prestressing of the frames 7 (FIGS. 4a, 8, 9 and 10) requires taking into account the kinematic-power connection between the bearing slots 7.1 and the ears 7.4 of the frame 7 of the planetary gear, which must be designed to withstand the expected interconnected radial displacements of the prestressing so that the bridges 7.2 are protected from overloading.

The dimensionless parameter, concentricity factor CF, has been used to assess the degree of static loading (FIG. 9) or unloading (FIG. 10) of the sun shaft 1. It is defined as the ratio, expressed as a percentage, between the difference between pitch circle radius $R_1+R_2$ of the planet wheels 2 and the pitch circle radius $R_{7f}$ of the cylindrical holes of the bearing slots 7.1 in the free (unassembled) state to the pitch circle radius $R_1+R_2$ of the planet wheels 2:

$$CF = \frac{(R_1 + R_2) - R_{7f}}{R_1 + R_2} \cdot 100\% \tag{17}$$

Under static loading (FIG. 9), the pitch circle radius $R_{7f}$ is smaller than the pitch circle radius $R_1+R_2$ of the planet wheels 2 and CF has a positive value ranging between 0.05% and 0.75% when frames 7 with medium to high radial stiffness $K_7$ are chosen and up to 3% when the chosen frames have low radial stiffness $K_7$.

Under static unloading (FIG. 10), the pitch circle radius $R_{7f}$ is larger than the pitch circle radius $R_1+R_2$ of the planet wheels 2 and CF has a negative value ranging between −0.05% and −0.75% when frames with medium to high radial stiffness $K_7$ are chosen and all the way to −3% when the frames have low radial stiffness $K_7$.

The values of CF are chosen with respect to the chosen radial stiffness $K_7$ of the frames 7, expressed via RSF, while the compensation for the tolerance chain of the typical design tolerances of the nominal dimensions of the sun shaft 1 and the planet wheels 2 normally does not range outside of CF between −0.05% and +0.05%.

FIG. 9 shows a planetary gear with its main elements in their assembled state. In this projection, drawn with dashed lines (f) in an exaggerated graphical scale are the contours of the free (unassembled) frame 7 in the case of static loading. As a result of the controlled prestressing following the assembly, the pitch circle radius $R_{7f}$ is forcedly increased to $R_1+R_2$ creating internal strain due to bending in the bridges 7.2 of the frame 7, generating radial forces $F_{2s}$ pointed towards the center of the sun shaft 1, which are transferred from the bearing slots 7.1 through the bearings 4 to the planet wheels 2 and counteracted by the increased radial forces in the sun shaft $F_1$.

The magnitude of each of the forces $F_{2s}$ acting on each of the frames 7 separately is determined by the radial stiffness $K_7$ of the frames 7 and the radial displacement of the axes of the cylindrical holes of the bearing slots 7.1 of the frames 7:

$$F_{2s} = K_7 \cdot [(R_1 + R_2) - R_{7f}] = K_7 \cdot \frac{CF}{100} \cdot (R_1 + R_2) N \tag{18}$$

The total static radial resultant force $F_1$ in the sun shaft 1 is the sum of the radial force $F_3$ of the outer ring 3 and the doubled loading radial force $F_{2s}$ from each of the two frames 7:

$$F_1 = F_3 + (2 \cdot F_{2s}) N \tag{19}$$

FIG. 10 shows a planetary gear and its major components in their assembled state. In this projection, the dashed lines (f) are used to present an exaggerated graphical scale of the contours of the free (unassembled) frame 7 for the case of static unloading. As a result of the controlled prestressing after assembly, the pitch circle radius $R_{7f}$ is forcedly decreased to $R_1+R_2$ creating internal strain due to bending in the bridges 7.2 of the frames 7, which generate radial forces $F_{2s}$ going away from the center towards the outer ring 3, which are transferred from the bearing slots 7.1 to the bearings 4 and the planet wheels 2 and are counteracted once the radial force $F_1$ in the sun shaft 1 is decreased.

The magnitude of the force $F_{2s}$ for each separate frame is determined in an equation (18), where the minus sign denotes that the direction of the force $F_{2s}$ in the case of unloading is opposite to the direction observed in the case of loading.

The total static radial resultant force $F_1$ in the sun shaft 1 is equal to the difference between the radial force $F_3$ of the outer ring 3 and the doubled unloading radial force $F_{2s}$ of each of the two frames 7:

$$F_1 = F_3 - (2 \cdot F_{2s}) N \tag{20}$$

The static loading (FIG. 9) or unloading (FIG. 10) has a considerably greater impact on the redistributed radial forces ratio $F_1/F_3$ compared to the redistribution under operation.

FIG. 11 shows a nomogram of the static redistribution of the radial force ratio $F_1/F_3$ resulting from static loading (FIG. 9) or unloading (FIG. 10) of the sun shaft 1 as a function of the degree of loading or unloading expressed with CF for three reference values of RSF, respectively, 8, 16 and 80. The nomogram shows lines L9, L10, L11, L12, L13 and L14, where lines L9, L10 and L11 correspond to the case where the sun shaft 1 experiences static loading (FIG. 9) while lines L12, L13 and L14 correspond to the case of static unloading of the sun shaft 1 (FIG. 10). Lines L9 and L14 correspond to an RSF of 8. Lines L10 and L13 correspond to an RSF of 16. Lines L11 and L12 correspond to an RSF of 80. All lines have been determined theoretically in accordance with the mathematical apparatus described above.

The nomogram shows that the static loading or unloading mechanism has a considerable potential for redistributing the radial force ratio $F_1/F_3$ when frames with greater stiffness are used. Considering the fact that the radial forces created by the static prestressing of the frames 7 apply significant loads on the bearings 4 of the planet wheels 2, the nomogram is limited to the values of the ratio of the radial forces $F_1/F_3$ between 0.8 and 1.2. It has to be underlined that the capabilities of this mechanism are not limited to this interval.

Figure 12:
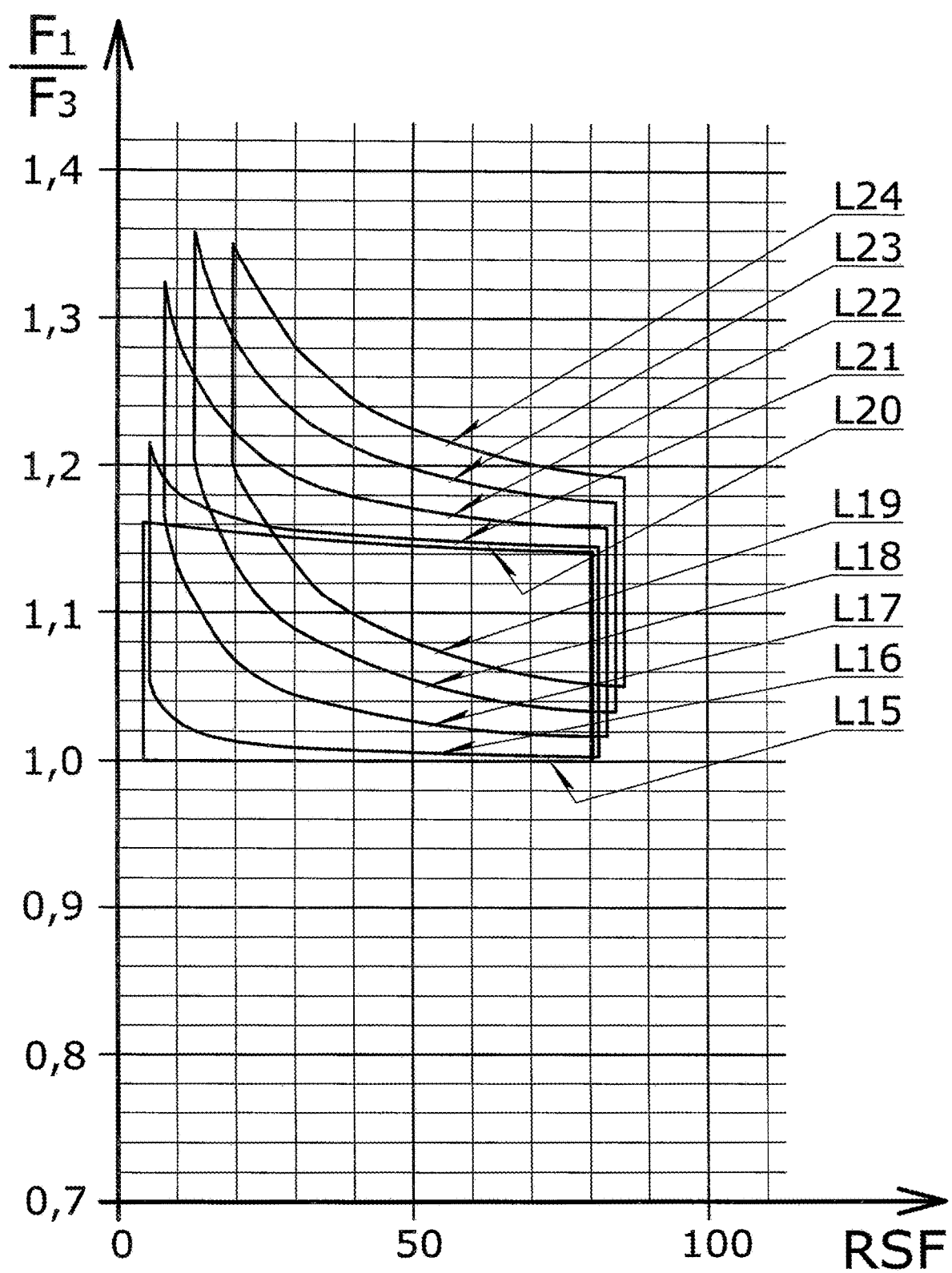
FIG. 12 is a nomogram that partially combines the nomograms on FIG. 7 and FIG. 11, showing the operational regions of the redistributed radial forces ratio for the first embodiment of the invention, with prestressing of the frame, corresponding to FIG. 9 as a function of the range of variation of the radial stiffness factor RSF in a non-stressed state and at four reference degrees of prestressing.

FIGS. 12, 13, 14 and 15 are nomograms of the operating fields of the planetary traction gear in accordance with the first (FIGS. 12 and 14) and second (FIGS. 13 and 15) embodiments of the invention showing the limits of the possible change of the redistributed radial forces ratio $F_1/F_3$ while the gear is in operation using the mechanism for initial static loading (FIG. 9) or unloading (FIG. 10) of the sun shaft 1 as a function of the radial stiffness $K_7$ of the frames 7, expressed as RSF for the following reference values of CF: 0.05%, 0.25%, 0.50% and 0.75% (FIGS. 12 and 13), and −0.05%, −0.25%, −0.50% and −0.75% (FIGS. 14 and 15). FIGS. 12 and 13, for illustrative purposes, show the operating field for CF at 0%, i.e. with no initial static loading or unloading. The operating fields contain parts of the data from the nomogram on FIG. 7.

Each operating field on FIGS. 12, 13, 14 and 15 consists of a lower and an upper curve limited on each end by one vertical straight line. The lower curves represent the redistributed radial forces ratio $F_1/F_3$ in the static state of the planetary gear and contain partial data from the nomogram on FIG. 11. The upper curves represent the redistributed radial forces ratio $F_1/F_3$ while transferring the largest possible input torque at a traction coefficient of 0.1 between the outer ring 3 and the planet wheels 2. Each imaginary vertical section between the upper and the lower curve for a particular value of the RSF represents a change in the redistributed radial forces ratio $F_1/F_3$ corresponding to an increase in the input torque from zero to the maximum possible torque before the slip limit.

In the nomogram on FIG. 12 the operating fields of the first embodiment of the invention and the static loading (FIG. 9) of the sun shaft 1 have been separated by the following lower lines describing the static state: L15 where CF equals 0%, L16 where CF equals 0.05%, L17 where CF equals 0.25%, L18 where CF equals 0.50% and L19 where CF equals 0.75%. The corresponding upper lines for the operating state (FIGS. 5a and 5b) are as follows: L20 where CF equals 0%, L21 where CF equals 0.05%, L22 where CF equals 0.25%, L23 where CF equals 0.50% and L24 where CF equals 0.75%.

In the nomogram on FIG. 13, the operating fields in the second embodiment of the invention and under static loading (FIG. 9) of the sun shaft 1 have been surrounded by the following lower lines describing the static state: L25 where CF equals 0%, L26 where CF equals 0.05%, L27 where CF equals 0.25%, L28 where CF equals 0.50% and L29 where CF equals 0.75%. Their corresponding upper lines for the operating state (FIGS. 6a and 6b) are as follows: L30 where CF equals 0%, L31 where CF equals 0.05%, L32 where CF equals 0.25%, L33 where CF equals 0.50% and L34 where CF equals 0.75%.

In the nomogram on FIG. 14, the operating fields for the first embodiment of the invention and static unloading (FIG. 10) of the sun shaft 1 are surrounded by the following lower lines describing the static state: L35 where CF equals −0.75%, L36 where CF equals −0.50%, L37 where CF equals −0.25% and L38 where CF equals −0.05%. Their corresponding upper lines describing the operating state (FIGS. 5a and 5b) are as follows: L39 where CF equals −0.75%, L40 where CF equals −0.50%, L41 where CF equals −0.25% and L42 where CF equals −0.05%.

In the nomogram on FIG. 15, the operating fields of the second embodiment of the invention and under static unloading (FIG. 10) of the sun shaft 1 are surrounded by the following lower lines describing the static state: L43 where CF equals −0.75%, L44 where CF equals −0.50%, L45 where CF equals −0.25% and L46 where CF equals −0.05%. Their corresponding upper lines describing their state under operation (FIGS. 6a and 6b) are as follows: L47 where CF equals −0.75%, L48 where CF equals −0.50%, L49 where CF equals −0.25% and L50 where CF equals −0.05%.

CITED DOCUMENTS

1. U.S. Pat. No. 6,960,147 B2

The invention claimed is:

1. Fixed-ratio planetary traction gear, comprising:
a rotating sun shaft whose axis of rotation coincides with the axis of an input shaft,
which is mounted on bearings into a housing,
where the sun shaft is supported and driven by at least three rotating around their own axes planet wheels encompassed by an outer ring axially fixed to the input shaft and installed by means of radial pre-stretch over the planet wheels,
which position the said outer ring in radial direction and are driven by it, while the planet wheels are mounted onto respective bearing slots and the said sun shaft is fixed axially by the contact with the planet wheels characterized by the fact that the housing comprises a rear housing (5) with support pillars (6) fixed to said rear housing and equal in number to the planet wheels (2),
where each support pillar (6) is located symmetrically between two adjacent planet wheels (2), with,
located on each side of the planet wheels (2) in the axial direction, an identical, radially-elastic flat frame (7),
which is movable in relation to the housing,
with the said frames (7) having respective bearing slots (7.1) to accept the bearings (4) of the planet wheels (2) and respective ears (7.4) to accept the support pillars (6).

2. Fixed-ratio planetary traction gear according to claim 1, characterized by the fact that each elastic flat frame (7) is a flat, planar, closed-contour component with constant thickness, which comprises at least three annular bearing slots (7.1) with a cylindrical hole to accept the respective bearing (4) of the respective planet wheel (2), whereas the axes of the annular bearing slots (7.1) are parallel to the axis of the sun shaft (1) and the annular bearing slots (7.1) are equidistant from a center of the frame (7) and each two adjacent annular bearing slots (7.1) are connected to one another via a respective curvilinear bridge (7.2) whose inner bend, towards the center, has an ear formed thereon (7.4) to accept the respective support pillar (6), with the axes of the annular bearing slots (7.1) coinciding with axes of the respective planet wheels (2).

3. Fixed-ratio planetary traction gear according to claim 1, characterized by the fact that in fully assembled state each elastic flat frame (7) is prestressed in radial direction by selection of the concentricity factor CF.

4. Fixed-ratio planetary traction gear, according to claim 1, characterized by the fact that each ear (7.4) of the elastic flat frames (7) has the shape of a closed contour.

5. Fixed-ratio planetary traction gear, according to claim 1, characterized by the fact that each ear (7.4) of the elastic flat frames (7) has the shape of a part of a closed contour.

6. Fixed-ratio planetary traction gear, according to claim 1, characterized by the fact that the ears (7.4) are equidistant to each other.

7. Fixed-ratio planetary traction gear, according to claim 1, characterized by the fact that a cylindrical hole in each of the ears (7.4) has at least one radial undercut (7.5*a*, 7.5*b*).

8. Fixed-ratio planetary traction gear according to claim 7, characterized by the fact that the radial undercut (7.5*a*, 7.5*b*) is concave in relation to the cylindrical hole in the ears (7.4), has a curvilinear shape and is symmetrical to a line connecting the axis of the ear (7.4) and a center of the frame (7), and is limited by a respective segment angle a, ß.

9. Fixed-ratio planetary traction gear, according to claim 1, characterized by the fact that a cylindrical hole of each of the ears (7.4) has an outer radial undercut (7.5*a*) and an inner radial undercut (7.5*b*).

10. Fixed-ratio planetary traction gear, according to claim 1, characterized by the fact that a segment angle a is within the range of 10° to 90°, while a segment angle ß is within the range of 10° to 70°.

11. Fixed-ratio planetary traction gear according to claim 1, characterized by the fact that the support pillars (6) have a shape of cylinders.

12. Fixed-ratio planetary traction gear according to claim 7, characterized by the fact that the support pillars (6) have the shape of prisms.

13. Fixed-ratio planetary traction gear according to claim 1, characterized by the fact that a ratio of a radial stiffness of the outer ring (3) to the radial stiffness of the frame (7) is within the range of 5 to 100.

14. Fixed-ratio planetary traction gear according to claim 1, characterized by the fact that a eccentricity of the annular ear (7.4) in relation to the support pillar (6) is within the range of 0.1% to 3.0% of a pitch circle radius R1+R2 of the planet wheels (2).

15. Fixed-ratio planetary traction gear according to claim 1, characterized by the fact that a concentricity factor CF is within the range of −3% to +3% of a pitch circle radius R1+R2 of the planet wheels (2).

\* \* \* \* \*